United States Patent
Zhao et al.

(10) Patent No.: US 12,007,224 B2
(45) Date of Patent: Jun. 11, 2024

(54) THREE-DIMENSIONAL SCANNER AND THREE-DIMENSIONAL SCANNING METHOD

(71) Applicant: Shining 3D Tech Co., Ltd., Zhejiang (CN)

(72) Inventors: Xiaobo Zhao, Zhejiang (CN); Chao Ma, Zhejiang (CN)

(73) Assignee: Shining 3D Tech Co., Ltd., Zhejiang (CN)

(*) Notice: Subject to any disclaimer, the term of this patent is extended or adjusted under 35 U.S.C. 154(b) by 131 days.

(21) Appl. No.: 17/771,470

(22) PCT Filed: Oct. 26, 2020

(86) PCT No.: PCT/CN2020/123684
§ 371 (c)(1),
(2) Date: Apr. 24, 2022

(87) PCT Pub. No.: WO2021/078300
PCT Pub. Date: Apr. 29, 2021

(65) Prior Publication Data
US 2022/0364853 A1 Nov. 17, 2022

(30) Foreign Application Priority Data

Oct. 24, 2019 (CN) .......................... 201911018729.0
Oct. 24, 2019 (CN) .......................... 201911018772.7

(51) Int. Cl.
*G01B 11/25* (2006.01)
*H04N 13/243* (2018.01)
(Continued)

(52) U.S. Cl.
CPC ...... *G01B 11/2545* (2013.01); *G01B 11/2509* (2013.01); *H04N 13/243* (2018.05); *H04N 13/25* (2018.05); *H04N 13/254* (2018.05)

(58) Field of Classification Search
CPC ... G01B 11/254; G01B 11/25; G01B 11/2513; G01B 11/2509; G01B 11/2527;
(Continued)

(56) References Cited

U.S. PATENT DOCUMENTS 10,324,170 B1 * 6/2019 Engberg, Jr. .......... G01S 7/4818
2009/0322859 A1 * 12/2009 Shelton ................ H04N 13/207
348/46
(Continued)

FOREIGN PATENT DOCUMENTS

CA 3022442 C * 8/2019 .......... G01B 11/002
CN 101975558 A 2/2011
(Continued)

OTHER PUBLICATIONS

Wang. Luyang et al. "Rapid 3D Shape Measurement Based on Colon-Encoded Fringe Projection" (Journal of Applied Optics), vol. 32, No. 2,Mar. 31, 2011 (Mar. 31, 2011), ISSN: 1002-2082, pp. 276-281.
(Continued)

*Primary Examiner* — Michael P Stafira
(74) *Attorney, Agent, or Firm* — Samson G. Yu

(57) ABSTRACT

The present application discloses a three-dimensional scanner and a three-dimensional scanning method. The three-dimensional scanner includes: an image projection device, configured to project light onto a target object, wherein the light includes predetermined light projected in the form of a color-coded stripe that is formed by coding stripes of at least two colors; and an image acquisition device, configured to acquire light modulated by the target object so as to obtain at least one stripe image in the case where light is projected onto the target object by the image projection device, wherein the obtained stripe image is taken as a coding image to determine respective stripe sequences and as a recon-
(Continued)

struction image to perform three-dimensional reconstruction on the target object.

19 Claims, 7 Drawing Sheets

(51) Int. Cl.
*H04N 13/25* (2018.01)
*H04N 13/254* (2018.01)

(58) Field of Classification Search
CPC ............ G01B 11/2545; G01B 11/2518; G01B 11/2504; G01B 11/2536; G01B 11/002; G01B 11/24; G01B 11/2433; G01B 11/22; G01B 11/0608; G01B 11/16; G01B 21/042; G01B 11/00; G01B 11/005; G01B 11/022; G01B 11/2441; G01B 11/26; G01B 11/245; G01B 11/2522; G01B 21/047; G01B 2210/52; G01B 11/02; G01B 11/167; G01B 11/2531; G01B 2210/56; G01B 2290/25; G01B 9/02; G01B 9/02028; G01B 9/0203; G01B 9/02045; G01B 9/0209; G01B 9/02097; H04N 13/254; H04N 19/70; H04N 13/271; H04N 19/44; H04N 19/30; H04N 19/46; H04N 19/172; H04N 19/174; H04N 13/246; H04N 19/188; H04N 19/186; H04N 19/105; H04N 19/184; H04N 5/33; H04N 19/132; H04N 13/296; H04N 19/102; H04N 19/423; H04N 21/44004; H04N 23/73; H04N 7/18; H04N 13/243; H04N 13/25; H04N 19/597; H04N 19/176; H04N 13/161; H04N 17/002; H04N 19/187; H04N 13/207; H04N 19/00; H04N 19/119; H04N 19/13; H04N 19/159; H04N 19/167; H04N 21/2547; H04N 21/41407; H04N 21/41415; H04N 21/4223; H04N 21/4318; H04N 21/43637; H04N 21/6175; H04N 21/654; H04N 21/6581; H04N 21/8133; H04N 21/8352; H04N 21/8358; H04N 5/445; H04N 19/96; H04N 21/234327; H04N 21/236; H04N 13/204; H04N 17/00; H04N 19/31; H04N 19/60; H04N 19/61; H04N 19/619; H04N 19/91; H04N 21/2343; H04N 21/235; H04N 21/434; H04N 21/435; H04N 21/440227; H04N 23/13; H04N 5/74; H04N 13/128; H04N 13/172; H04N 13/261; H04N 13/324; H04N 13/334; H04N 13/337; H04N 13/363; H04N 13/366; H04N 19/107; H04N 19/122; H04N 19/136; H04N 19/139; H04N 19/18; H04N 19/20; H04N 19/42; H04N 19/436; H04N 19/463; H04N 19/63; H04N 21/44209; H04N 21/64322; H04N 21/8456; H04N 21/85406; H04N 23/71; H04N 25/53; H04N 9/3179; H04N 9/3191; H04N 9/8042
See application file for complete search history.

(56) References Cited

U.S. PATENT DOCUMENTS

| | | | |
|---|---|---|---|
| 2012/0258431 A1* | 10/2012 | Lauren | A61B 5/4542 600/595 |
| 2014/0004953 A1 | 1/2014 | Rama Rao et al. | |
| 2014/0037146 A1* | 2/2014 | Taguchi | G01B 11/2527 382/153 |
| 2019/0025452 A1 | 1/2019 | Wang et al. | |

FOREIGN PATENT DOCUMENTS

| | | | | |
|---|---|---|---|---|
| CN | 1102445165 | | 5/2012 | |
| CN | 102878950 A | * | 1/2013 | ......... G01B 11/2509 |
| CN | 202770413 | | 3/2013 | |
| CN | 104780865 A | | 7/2015 | |
| CN | 106251376 | | 12/2016 | |
| CN | 106461379 | | 2/2017 | |
| CN | 107869966 A | * | 4/2018 | ........... G01B 11/254 |
| CN | 108534714 A | * | 9/2018 | ......... G01B 11/2518 |
| CN | 108827184 A | | 11/2018 | |
| CN | 108955571 A | * | 12/2018 | ........... G01B 11/254 |
| CN | 108955574 A | * | 12/2018 | ......... G01B 11/2509 |
| CN | 108986177 A | * | 12/2018 | |
| CN | 109283186 A | | 1/2019 | |
| CN | 109489583 A | * | 3/2019 | ............. A61C 9/006 |
| CN | 109489583 A | | 3/2019 | |
| DE | 102012222505 A1 | * | 6/2014 | ............. G01B 11/25 |
| JP | 2004325096 A | | 11/2004 | |
| JP | B6342061 B2 | | 6/2018 | |
| JP | 2019525167 A | | 9/2019 | |
| KR | 20130091090 A | * | 8/2013 | |
| WO | WO-2012007003 A1 | * | 1/2012 | ......... A61C 13/0004 |
| WO | 2018073824 A1 | | 4/2018 | |
| WO | WO-2019015154 A1 | * | 1/2019 | ........... G01B 11/002 |

OTHER PUBLICATIONS

The first Examination report of patent family AU application No. 2020371142 dated Mar. 14, 2023.
The first Examination report of patent family JP application No. 2022-524057 dated Mar. 7, 2023.
The first Examination report of patent family KR application No. 9-5-2023-113999238 dated Dec. 19, 2023.
The first EESR of patent family EP application issued on Nov. 17, 2023.

\* cited by examiner

FIG. 8

| A first image and a second image is obtained, the first image and the second image being stripe images obtained based on the same beam | — S801 |

| Coding sequences of respective stripes is determined based on the first image | — S803 |

| Stripes of the second image is matched based on the coding sequences to realize three-dimensional reconstruction so as to obtain three-dimensional data of a target object | — S805 |

| Texture data is obtained, and color three-dimensional data of the target object based on the three-dimensional data and the texture data is obtained | — S807 |

FIG. 9

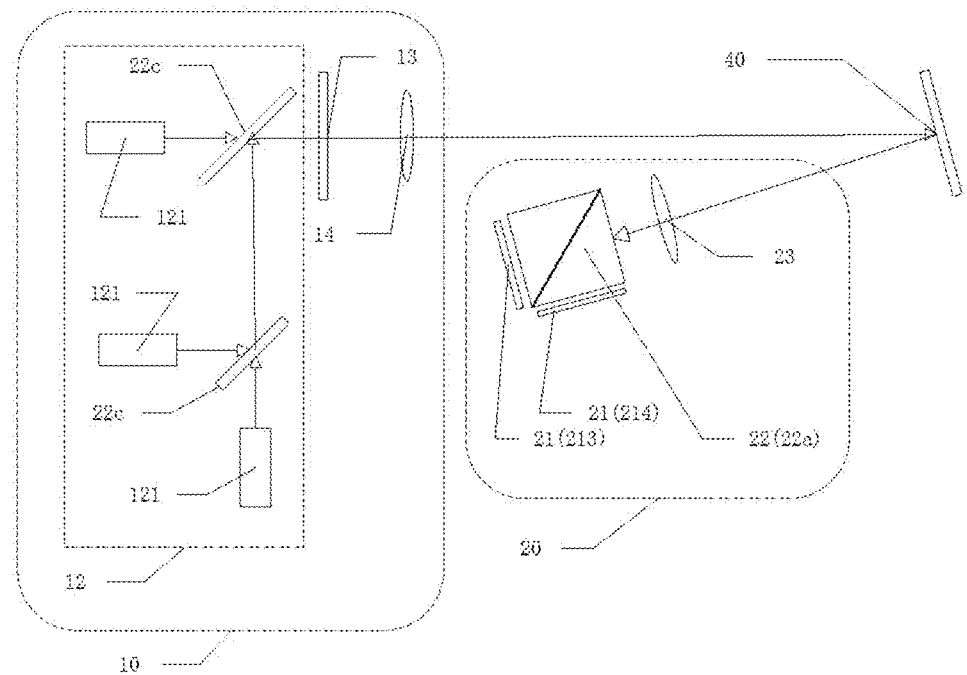

THREE-DIMENSIONAL SCANNER AND THREE-DIMENSIONAL SCANNING METHOD

CROSS-REFERENCE TO RELATED APPLICATION

The present disclosure claims benefit of Chinese Patent Application No. 201911018729.0, filed to the China National Intellectual Property Administration on Oct. 24, 2019, entitled "Three-Dimensional Scanner and Three-Dimensional Scanning Method", and Chinese Patent Application No. 201911018772.7, filed to the China National Intellectual Property Administration on Oct. 24, 2019, entitled "Three-Dimensional Scanner, Three-Dimensional Scanning System and Three-Dimensional Scanning Method", the disclosures of which are hereby incorporated by reference in its entirety.

TECHNICAL FIELD

The present application relates to the field of three-dimensional scanning, and in particular, to a three-dimensional scanner and a three-dimensional scanning method.

BACKGROUND ART

In the field of intra-oral three-dimensional scanning, existing three-dimensional scanners usually perform three-dimensional reconstruction processing as follows. Firstly, sinusoidal stripes are de-matched based on time coding, and then three-dimensional reconstruction and splicing fusion are performed to obtain a three-dimensional shape of an object. Secondly, a three-dimensional shape of an object is obtained according to an algorithm of extracting a stripe center line and performing three-dimensional reconstruction and splicing fusion based on time coding. Thirdly, a three-dimensional shape of an object is obtained based on the principle of microscopic confocal three-dimensional imaging.

However, the above-mentioned modes all have defects, and are not suitable for the promotion and use of an intra-oral three-dimensional scanning device. The specific defects are as follows:

Firstly, it is difficult for a three-dimensional reconstruction method based on time coding to realize handheld scanning with small volume, and thus cannot be used in the field of intra-oral three-dimensional scanning. In addition, the three-dimensional reconstruction method based on time coding also needs to be supported by a high-frame rate camera and a high-speed algorithm, and thus the generation cost of three-dimensional scanning equipment is high, which is not conducive to promotion and use.

Secondly, the hardware cost required for three-dimensional reconstruction based on the principle of microscopic confocal three-dimensional imaging is high, which is not conducive to the promotion and use of the three-dimensional scanning equipment either.

In view of the technical problem that existing three-dimensional reconstruction methods in the related art are high in hardware cost and are thus not conducive to the promotion and use of a three-dimensional scanning device, an effective solution has not been proposed at present.

SUMMARY OF THE INVENTION

The present application provides a three-dimensional scanner and a three-dimensional scanning method, which are intended to solve the technical problem that existing three-dimensional reconstruction methods in the related art are high in hardware cost and are thus not conducive to the promotion and use of a three-dimensional scanning device.

According to an aspect of the present application, a three-dimensional scanner is provided. The three-dimensional scanner includes: an image projection device, configured to project light onto a target object, wherein the light includes predetermined light projected in the form of a color-coded stripe that is formed by coding stripes of at least two colors; and an image acquisition device, configured to acquire light modulated by the target object so as to obtain at least one stripe image in the case where light is projected onto the target object by the image projection device, wherein the obtained stripe image is taken as a coding image to determine respective stripe sequences and as a reconstruction image to perform three-dimensional reconstruction on the target object.

According to another aspect of the present application, a three-dimensional scanning system is provided. The three-dimensional scanning system includes: a three-dimensional scanner, configured to project light onto a target object and acquire light modulated by the target object so as to obtain at least one stripe image in the case where light is projected onto the target object, wherein the projected light includes predetermined light projected in the form of a color-coded stripe that is formed by coding stripes of at least two colors; and an image processor, connected to the three-dimensional scanner, and configured to obtain at least one stripe image obtained by the three-dimensional scanner, and take the stripe image as a coding image to determine respective stripe sequences and as a reconstruction image to perform three-dimensional reconstruction on the target object.

The three-dimensional scanner is the three-dimensional scanner described in any one of the above.

According to another aspect of the present application, a three-dimensional scanning method is provided. The three-dimensional scanning method includes: projecting predetermined light onto a target object in the form of a color-coded stripe; acquiring light modulated by the target object, and obtaining at least one stripe image based on the light, where the obtained stripe image is taken as a coding image to determine respective stripe sequences and as a reconstruction image to perform three-dimensional reconstruction on the target object; determining sequences of respective stripes in the plurality of stripe images based on the coding image; and performing three-dimensional reconstruction on the reconstruction image based on the sequences, and obtaining three-dimensional data of the target object.

The three-dimensional scanning method is applied to the three-dimensional scanner described in any one of the above.

According to another aspect of the present application, a three-dimensional scanning method is provided. The three-dimensional scanning method includes: obtaining a first image and a second image, where the first image and the second image are stripe images obtained based on a same beam; determining coding sequences of respective stripes based on the first image; and matching stripes of the second image based on the coding sequences to realize three-dimensional reconstruction so as to obtain three-dimensional data of a target object.

The three-dimensional scanning method is applied to the three-dimensional scanner described in any one of the above.

In the three-dimensional scanner provided by embodiments of the present application, an image projection device projects light onto a target object. The light includes predetermined light projected in the form of a color-coded stripe that is formed by coding stripes of at least two colors. An image acquisition device acquires light modulated by the target object so as to obtain at least one stripe image in the case where light is projected onto the target object by the image projection device. Photosensitive bands of the image acquisition device correspond to stripe colors contained in the color-coded stripe one by one. The obtained stripe image is taken as a coding image to determine respective stripe sequences and as a reconstruction image to perform three-dimensional reconstruction on the target object. The technical problem that existing three-dimensional reconstruction methods in the related art are high in hardware cost and are thus not conducive to the promotion and use of a three-dimensional scanning device is thus solved.

It should be noted that the three-dimensional scanner mentioned in the embodiments of the present application is to obtain a three-dimensional shape of a target object according to a stripe extraction algorithm based on spatial coding. Therefore, the three-dimensional scanner needs only one frame of two-dimensional image to realize three-dimensional reconstruction of a target object, thereby greatly reducing the frame rate of a camera and the operation cost of an algorithm, and facilitating the promotion and use of the three-dimensional scanner. Specifically, since the three-dimensional scanner does not need to use a camera with a high frame rate, the volume of the camera required in the three-dimensional scanner can be reduced, thereby making the three-dimensional scanner more suitable for obtaining a three-dimensional shape of an intra-oral object.

And based on the technical feature that the three-dimensional scanner realizes three-dimensional reconstruction of the target object only with one frame of two-dimensional image at a minimum, an obtaining time difference between a reconstruction image and a texture image is greatly shortened, time required for projecting and photographing in the three-dimensional reconstruction of the target object is reduced, and likewise, the three-dimensional scanner is more suitable for obtaining the three-dimensional shape of an intra-oral object (facilitating handheld scanning by the three-dimensional scanner).

In addition, since the three-dimensional scanner provided by the embodiments of the present application uses color as spatial coding information, the technical effects of facilitating identification of coding information and improving identification accuracy are also achieved.

In addition, the three-dimensional scanner mentioned in the embodiments of the present application is to obtain a three-dimensional shape of a target object according to a stripe extraction algorithm based on spatial coding, and the technical effect of eliminating the projection requirements of dynamic projection is also achieved.

According to an aspect of the present application, a three-dimensional scanner is provided. The three-dimensional scanner includes: an image projection device, configured to respectively project, in each predetermined period, a predetermined stripe pattern corresponding to the predetermined period onto a target object, wherein stripes of each predetermined stripe pattern are disposed according to arrangement of predetermined color-coded stripes, each predetermined stripe pattern includes stripes of at least one color in the predetermined color-coded stripes, and a plurality of predetermined stripe patterns include stripes of at least two colors in the predetermined color-coded stripes, and the stripes in the predetermined stripe patterns are arranged in the same way as stripes of the same color in the predetermined color-coded stripes; and an image acquisition device, configured to acquire light modulated by the target object so as to obtain a plurality of stripe images in the case where predetermined stripe patterns are projected onto the target object, wherein the obtained stripe images are taken as coding images to determine respective stripe sequences and as reconstruction images to perform three-dimensional reconstruction on the target object.

According to an aspect of the present application, a three-dimensional scanning system is provided. The three-dimensional scanning system includes a three-dimensional scanner, configured to respectively project, in each predetermined period, a predetermined stripe pattern corresponding to the predetermined period onto a target object, and acquire light modulated by the target object so as to obtain a plurality of stripe images in the case where predetermined stripe patterns are projected onto the target object, wherein stripes of each predetermined stripe pattern are disposed according to arrangement of predetermined color-coded stripes, each predetermined stripe pattern includes stripes of at least one color in the predetermined color-coded stripes, a plurality of predetermined stripe patterns include stripes of at least two colors in the predetermined color-coded stripes, and the stripes in the predetermined stripe patterns are arranged in the same way as stripes of the same color in the predetermined color-coded stripes; and an image processor, connected to the three-dimensional scanner, and configured to obtain a plurality of stripe images obtained by the three-dimensional scanner, and take the stripe images as coding images to determine respective stripe sequences and as reconstruction images to perform three-dimensional reconstruction on the target object.

According to an aspect of the present application, a three-dimensional scanning method is provided. The three-dimensional scanning method includes: respectively emitting, in each predetermined period, initial light corresponding to the predetermined period, where each beam of the initial light is composed of light of at least one color in the predetermined color-coded stripes, and after each beam of the initial light is transmitted by patterns of the predetermined color-coded stripes on the light transmitting portion, respective corresponding predetermined color stripes are generated and projected onto a target object; respectively acquiring light modulated by the target object in the plurality of predetermined periods, and obtaining a plurality of stripe images based on the above light, where the obtained stripe images are taken as coding images to determine respective stripe sequences and as reconstruction images to perform three-dimensional reconstruction on the target object; determining sequences of respective stripes in the plurality of stripe images based on the coding images; and performing three-dimensional reconstruction on the reconstruction images based on the sequences, and obtaining three-dimensional data of the target object.

According to an aspect of the present application, a three-dimensional scanning method is provided. The three-dimensional scanning method includes: obtaining a first image and a second image, wherein the first image and the second image are stripe images obtained based on a same light transmitting portion; determining coding sequences of respective stripes based on the first image; and matching stripes of the second image based on the coding sequences to realize three-dimensional reconstruction so as to obtain three-dimensional data of a target object.

In summary, by using the stripe extraction algorithm based on spatial coding, the present application achieves the technical effects of eliminating the projection requirements of dynamic projection and realizing three-dimensional reconstruction of a target object only with a few two-dimensional images, and solves the technical problem that three-dimensional reconstruction methods in the related art are high in hardware cost and are thus not conducive to the promotion and use of a three-dimensional scanning device.

In addition, the three-dimensional scanner also improves the accuracy of three-dimensional identification by using colors as spatial coding information.

BRIEF DESCRIPTION OF THE DRAWINGS

The accompanying drawings, constituting a part of the present application, are used for providing a further understanding of the present application. Exemplary embodiments of the present application and the description thereof are used for explaining the present application, rather than constituting improper limitations to the present application. In the drawings:

FIG. 8 is a flowchart II of an optional three-dimensional scanning method according to an embodiment of the present application;

FIG. 9 is a schematic diagram IV of an optional three-dimensional scanner according to an embodiment of the present application;

Figure 1:
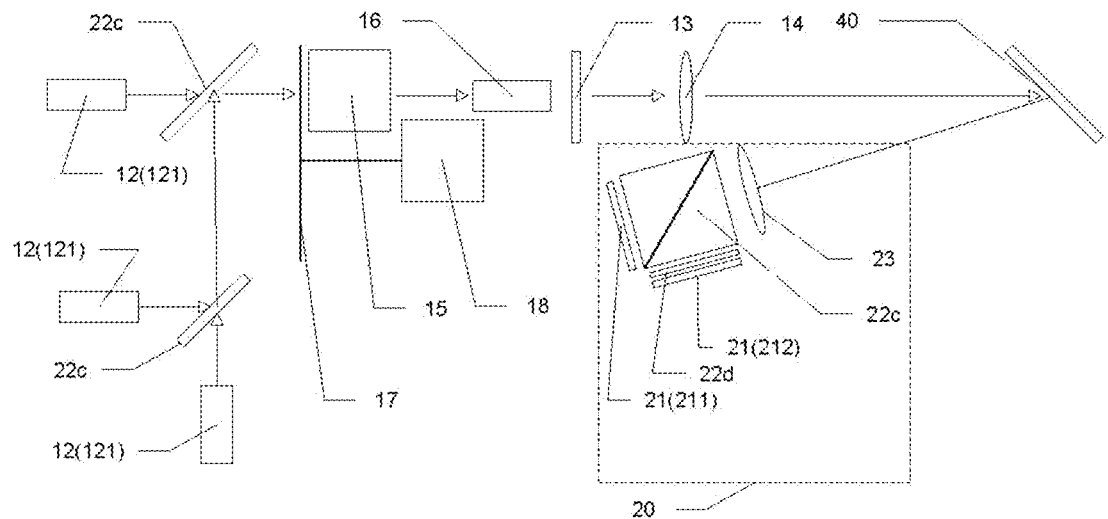
FIG. 1 is a schematic diagram I of an optional three-dimensional scanner according to an embodiment of the present application.

The above drawings include the following reference numerals:

10, image projection device; 20, image acquisition device; 30, illumination member; 40, reflector;

11, DLP projection portion; 12, light emitting portion (light source emitter); 13, light transmitting portion (color grating sheet); 14, first imaging lens; 15, beam coupling system; 16, light bar; 17, phase modulation element; 18, drive motor; 121, light source unit;

21, camera; 22, beam processing device; 22a, right-angled two-channel dichroic prism; 22b, three-channel dichroic prism; 22c, partial-reflection partial-transmission prism; 22d, light filter; 23, second imaging lens; 211, first camera; 212, second camera; 213, third camera; 214, fourth camera; 215, fifth camera; 216, sixth camera; and 217, seventh camera.

DETAILED DESCRIPTION OF THE INVENTION

It should be noted that embodiments in the present application and features in the embodiments may be combined with each other without conflict. The present application will now be described in detail in connection with the embodiments with reference to the accompanying drawings.

In order that those skilled in the art better understand the solutions of the present application, the technical solutions in the embodiments of the present application will now be described clearly and completely with reference to the accompanying drawings in the embodiments of the present application. It is obvious that the described embodiments are merely some, but not all, embodiments of the present application. All other embodiments obtained by those of ordinary skill in the art based on the embodiments in the present application without involving creative efforts should fall within the scope of protection of the present application.

It should be noted that the terms "first", "second", and the like in the description and claims of the present application and in the above drawings are used for distinguishing between similar objects and not necessarily for describing a particular sequential or chronological order. It will be appreciated that the data so used are interchangeable under appropriate circumstances for the embodiments of the present application described herein. In addition, the terms "include" and "have", as well as any variations thereof, are intended to cover a non-exclusive inclusion. For example, a process, method, system, product, or device that includes a list of steps or units is not necessarily limited to those steps or units expressly listed, but may include other steps or units not expressly listed in or inherent to such process, method, product, or device.

According to embodiments of the present application, a three-dimensional scanner is provided.

FIG. 1 is a schematic diagram of a three-dimensional scanner according to an embodiment of the present application. As shown in FIG. 1, the three-dimensional scanner includes the following components.

An image projection device 10 is configured to project light onto a target object. The light includes predetermined light projected in the form of a color-coded stripe that is formed by coding stripes of at least two colors. That is, stripes of at least two colors are coded in order to combine into a color-coded stripe.

It should be noted that the above color-coded stripe may be formed by coding a plurality of pure-color stripes and may also be formed by coding a plurality of non-pure-color stripes. However, in order to distinguish the respective color stripes, the color-coded stripe formed by coding a plurality of pure-color stripes such as red, green, blue, cyan, magenta, and yellow is preferable. Specifically, R, G and B components of each color stripe in the color-coded stripe are preferably 0 or 255, and at most only two components will be 255 at the same time.

It should also be noted that since different colors have different diffusion and light transmitting performances on tooth surfaces, in order to obtain a high-quality stripe pattern (stripes are more uniform, and the contrast between the stripes is also more uniform), in the present application, the widths of the stripes in the color-coded stripe are respectively set to different values, so as to adjust the diffusion performance of red, green and blue colors on a target object, thereby reducing the mutual interference between the respective color stripes, and improving the extraction accuracy of the respective color stripes.

Figure 2:
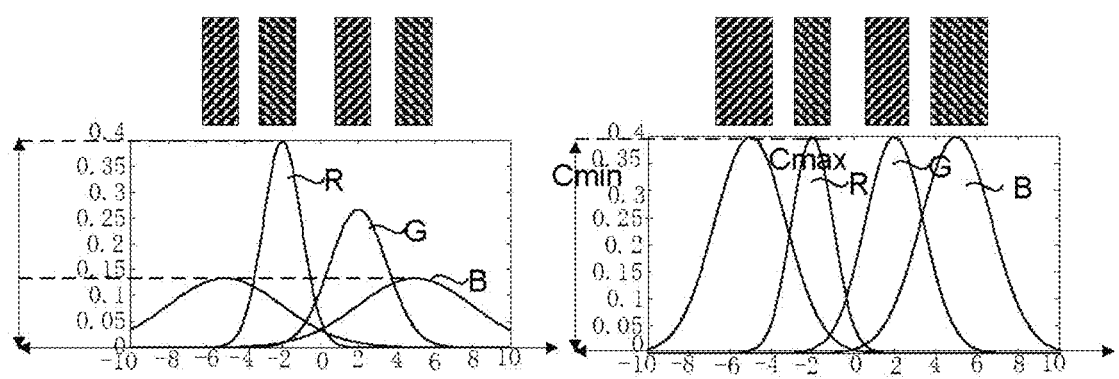
FIG. 2 is a schematic diagram of diffusion and contrast of three colors: red, green and blue on an object according to an embodiment of the present application.

Specifically, as shown in FIG. 2, the diffusion and contrast of three colors RGB on an object are different. At this moment, by adjusting the width of each color stripe, the three colors RGB have a uniform diffusion performance and an average contrast of each color stripe, thereby improving the accuracy of stripe extraction.

Optionally, the above image projection device 10 may adopt a transmitting projection mode.

Specifically, after light of at least two different bands is emitted by a light source emitter 12, the light of at least two different bands is collimated and converged, the light is transmitted through a MASK pattern, and the pattern is projected onto a target object through a first imaging lens 14.

That is, the above image projection device 10 includes: a light source emitter 12, a color grating sheet 13 and a first imaging lens 14. The light source emitter 12 is configured to emit light of at least two different bands. The color grating sheet 13 and the first imaging lens 14 are arranged on a transfer path of the light. The light is transmitted through a MASK pattern on the color grating sheet 13. The pattern is projected onto a target object through the first imaging lens 14. Color categories contained in the MASK pattern on the color grating sheet 13 correspond to band categories contained in the light transmitted therethrough one by one.

In an optional example, the above light source emitter 12 may be a laser emitter. Laser light emitted by the laser emitter has the following features: directed light emission, extremely high brightness, extremely pure color, and good coherence.

Taking a laser emitter as an example, it should be noted that laser light is prone to inappropriate aperture and divergence angle, and non-uniform light field intensity. Therefore, the image projection device 10 provided by embodiments of the present application processes light through a beam coupling system 15 and a light bar 16 to adjust the aperture and divergence angle of the laser light and output a light field with uniform intensity.

In the case where the aperture and divergence angle of the laser light are both small, the beam coupling system 15 may be composed of a collimating system and a converging lens, or an optical system having an equivalent function thereto. In the case where the divergence angle of the laser right is large, the beam coupling system 15 may be a more complex converging system composed of three or four or more lens elements.

The light bar 16 may be an elongated hexahedral prism, a cylindrical prism or a pyramidal prism. An emergent end face of the light bar 16 is parallel to an incident end face of the light bar, and the emergent end face and the incident end face may be rectangular or square. The light bar 16 may be a solid bar in which light is transferred inside a solid transparent medium, or a hollow bar in which light is reflected repeatedly in a space defined by four solid interfaces. The emergent end face and the incident end face of the solid bar are each coated with an anti-reflection film, and a surface is coated with a reflection film or not coated with a film. An internal surface of the hollow bar is coated with a high reflection film. Specifically, light is reflected and mixed repeatedly on the internal surface of the light bar 16, thereby outputting a light field with uniform intensity.

That is, the above image projection device 10 further includes the beam coupling system 15 and the light bar 16. The beam coupling system 15 and the light bar 16 are arranged on a transfer path of light. At least two beams of light of different bands, emitted from the light source emitter 12, are respectively projected onto the color grating sheet 13 through the beam coupling system 15 and the light bar 16.

Taking a laser emitter as an example, it should be noted that diffraction spots appear in a projected pattern due to the coherence of laser light. Therefore, in the case where a laser light source emitter 12 is adopted in the image projection device 10 provided by embodiments of the present application, the image projection device 10 further includes a phase modulation element 17 and a drive motor 18. Specifically, as shown in FIG. 2, the phase modulation element is arranged on a transfer path of laser light. After the light source emitter 12 emits at least two beams of laser light of different bands, the phase modulation element located on the transfer path of the laser light performs real-time phase modulation on the laser light. In addition, the phase modulation element is driven by the driving motor 18 to rotate at a certain speed around a rotation axis.

The phase modulation element may be a thin sheet made of a transparent optical material, a micro-optical element, or a random phase plate.

The phase modulation element may be located in front of the beam coupling system 15 or may also be located behind the beam coupling system 15.

Taking FIG. 1 as an example, a plurality of components that may be included in the above image projection device 10 are illustrated. The image projection device 10 includes: three laser emitters, two partial-reflection partial-transmission beam splitters, the phase modulation element 17 (and the drive motor 18 connected to the phase modulation element 17), the beam coupling system 15, the light bar 16, the color grating sheet 13, and the first imaging lens 14.

The image projection device 10 emits laser beams through the three laser emitters. For example, one of the laser emitters emits a red laser beam, one of the laser emitters emits a green laser beam, and the other laser emitter emits a blue laser beam. The laser beams respectively pass through the two partial-reflection partial-transmission beam splitters to achieve the technical effect of beam convergence. The converged laser beam transmits the rotating phase modulation element 17 so as to avoid the occurrence of diffraction spots in a projected pattern due to the coherence of the laser light. Further, the laser beam respectively passes through the beam coupling system 15 and the light bar 16, so as to adjust the aperture and divergence angle of the laser light, and output a light field with uniform intensity. Finally, the laser beam is transmitted through the color grating sheet 13 to generate predetermined light projected in the form of a color-coded stripe, and the predetermined light is projected onto a target object through the first imaging lens 14. Certainly, the image projection device 10 may also be provided with only two laser emitters, only ensuring that laser beams of at least two colors may be emitted for forming color stripes.

In addition, the three-dimensional scanner may further include a reflector 40. The reflector 40 is configured to change a transfer path of light, and may be used in the present embodiment for reflecting predetermined light generated by the image projection device 10 so as to change the transfer path of the predetermined light. The predetermined light is reflected to the target object via the reflector 40 and to the image acquisition device 20 via the target object, so as to reduce the constraint on the installation of the image projection device 10 and the image acquisition device 20, and reduce the size of space required for using the image projection device 10 and the image acquisition device 20. For example, the size of space required for the image projection device 10 to project predetermined light onto the target object is: a space size of the image projection device 10 per se and a space size corresponding to a path length of predetermined light projected onto the target object. If the image projection device 10 is applied to the inside of an oral cavity and the image projection device 10 does not include the reflector 40, the above two required spaces are arranged linearly, which would bring a lot of inconvenience to the use of the image projection device 10. If the image projection device 10 is applied to the inside of the oral cavity and the image projection device 10 includes the reflector 40, the above two required spaces are folded. At this moment, the image projection device 10 can preferably utilize the inside space of the oral cavity and achieve a good projection effect.

Optionally, the above image projection device 10 may adopt a DLP projector.

Specifically, the DLP projector adopts a digital light procession (DLP) projection technology and uses a digital micromirror device (DMD) as a main key processing element to implement digital optical processing. It should be noted that in the present application, by using the DLP projector as the image projection device 10, the technical effect of obtaining an image with a high contrast and keeping a beautifully colored picture is achieved.

In an optional example, a projection module provided by embodiments of the present application has a pixel size of 7-8 microns. Specifically, in the case where the three-dimensional scanner provided by embodiments of the present application to the field of three-dimensional scanning of teeth, the digital micromirror device in the image projection device 10 can have a built-in 2048×1152 array at most. When the digital micromirror device projects predetermined light onto a single tooth (about 15 mm), a color-coded stripe with a single pixel size of about 7.3 um may be obtained. It should be noted that a smaller pixel size may reduce interference between adjacent stripe images on the tooth.

For example, the image projection device 10 provided by embodiments of the present application may adopt DLP LightCrafter. Specifically, an optical engine of DLP Light-Crafter may be an RGB LED light source engine specially developed by Young Optics for DLP3000 DMD. DLP3000 DMD is installed at the end of a light source engine. DLP3000 DMD of a 0.3WVGA chip set is composed of 415,872 micromirrors with a micromirror spacing of 7.6 μm, a micromirror matrix of 608×684 is formed, and a WVGA (854×480) resolution image can be generated at a maximum.

An image acquisition device 20 is configured to acquire light reflected by the target object. In the present embodiment, the image acquisition device is configured to acquire light modulated by the target object so as to obtain at least one stripe image in the case where light is projected onto the target object by the image projection device 10. The obtained stripe image is taken as a coding image to determine respective stripe sequences and as a reconstruction image to perform three-dimensional reconstruction on the target object. The image acquisition device is further configured to acquire illumination light reflected by the target object in the case where the target object is illuminated by an illumination member 30.

It should be noted that since light is projected onto the target object by the image projection device 10, predetermined light included in the projected light is also projected onto the target object. At this moment, the predetermined light is projected onto the target object in the form of a color-coded stripe, and the color-coded stripe is also mapped on the target object. Further, the image acquisition device 20 acquires the color-coded stripe mapped on the target object to obtain at least one stripe image.

That is, light modulated by the target object is: predetermined light modulated by the target object in its own shape, so that a color-coded stripe corresponding to the predetermined light is changed correspondingly based on the shape of the target object. At this moment, the image acquisition device 20 acquires the changed color-coded stripe to generate at least one stripe image.

Preferably, the image acquisition device 20 simultaneously obtains at least two stripe images. The above at least two stripe images correspond to the same modulated color-coded stripe. Specifically, the image projection device 10 projects a color-coded stripe onto the target object. The color-coded stripe is modulated by the target object and is synchronously acquired by the image acquisition device 20. The image acquisition device 20 generates at least two stripe images in real time.

In the three-dimensional scanner provided by embodiments of the present application, the image projection device 10 projects light onto a target object. The light includes predetermined light projected in the form of a color-coded stripe that is composed of coded strips of at least two colors. The image acquisition device 20 acquires light modulated by the target object so as to obtain at least one stripe image in the case where light is projected onto the target object by the image projection device 10. Photosensitive bands of the image acquisition device 20 correspond to stripe colors contained in the color-coded stripe. The image acquisition device can obtain coded stripes of at least two colors in the color-coded stripes. Generally, the image projection device is arranged in combination with the image acquisition device. Colors contained in the predetermined light of the image projection device may all be acquired by the image acquisition device. The obtained stripe image is taken as a coding image to determine respective stripe sequences and as a reconstruction image to perform three-dimensional reconstruction on the target object. The technical problem that existing three-dimensional reconstruction methods in the related art are high in hardware cost and are thus not conducive to the promotion and use of a three-dimensional scanning device is thus solved.

It should be noted that the three-dimensional scanner mentioned in the embodiments of the present application is to obtain a three-dimensional shape of a target object according to a stripe extraction algorithm based on spatial coding. Therefore, the three-dimensional scanner needs only one frame of two-dimensional image to realize three-dimensional reconstruction of a target object, thereby greatly reducing the frame rate of a camera 21 and the operation cost of an algorithm, and facilitating the promotion and use of the three-dimensional scanner. Specifically, since the three-dimensional scanner does not need to use the camera 21 with a high frame rate, the volume of the camera 21 required in the three-dimensional scanner can be reduced, thereby making the three-dimensional scanner more suitable for obtaining a three-dimensional shape of an intra-oral object.

And based on the technical feature that the three-dimensional scanner realizes three-dimensional reconstruction of the target object only with one frame of two-dimensional image at a minimum, an obtaining time difference between a reconstruction image and a texture image is greatly shortened, time required for projecting and photographing in the three-dimensional reconstruction of the target object is reduced, and likewise, the three-dimensional scanner is more suitable for obtaining the three-dimensional shape of an intra-oral object (facilitating handheld scanning by the three-dimensional scanner).

In addition, since the three-dimensional scanner provided by the embodiments of the present application uses color as spatial coding information, the technical effects of facilitating identification of coding information and improving identification accuracy are also achieved.

In addition, the three-dimensional scanner mentioned in the embodiments of the present application is to obtain a three-dimensional shape of a target object according to a stripe extraction algorithm based on spatial coding, and the technical effect of eliminating the projection requirements of dynamic projection is also achieved.

Optionally, in the three-dimensional scanner provided by embodiments of the present application, the image acquisition device 20 further includes a plurality of cameras 21. The plurality of cameras 21 include at least one monochrome camera. The image acquisition device 20 processes the light modulated by the target object through the plurality of cameras 21 to obtain a plurality of stripe images. A stripe image obtained by the at least one monochrome camera is taken as a reconstruction image to perform three-dimensional reconstruction on the target object. Stripe images obtained by at least a plurality of monochrome cameras are taken as coding images to determine respective stripe sequences, and/or, a stripe image obtained by at least one color camera is taken as a coding image to determine respective stripe sequences.

It should be noted that stripe information contained in at least one stripe image as a coding image needs to determine coding sequences of respective stripes. That is, the coding image is composed of stripe images capable of determining the coding sequences of the respective stripes.

That is, a pre-designed color-coded stripe image is projected onto a target object (e.g. a tooth or a gum) by the image projection device 10, while the image acquisition device 20 is controlled to rapidly acquire an image of the target object with a projected pattern. The cameras 21 included in the image acquisition device 20 respectively acquire different stripe images. For example, camera A is a color camera and obtains a color stripe image, and camera B is a monochrome camera and obtains a monochrome stripe image. At this moment, the color stripe image and the monochrome stripe image are transferred to a computer terminal. The computer terminal takes the color stripe image as coding information and the monochrome stripe image as a reconstruction image so as to obtain a three-dimensional shape of the target object.

It should be noted that since the imaging resolution of the monochrome camera is higher than that of the color camera, the situation of low resolution may occur if the image acquisition device 20 obtains a stripe image by only one color camera. In order to avoid difficult three-dimensional reconstruction due to low resolution, in the above embodiment, the image acquisition device 20 includes a plurality of cameras 21. The plurality of cameras 21 include at least one monochrome camera, and a monochrome stripe image with high imaging resolution is taken as a reconstruction image to obtain a three-dimensional shape of the target object. In an example where the camera 21 included in the image acquisition device 20 may be a CCD camera, it is assumed that the color-coded stripe corresponding to the predetermined light is formed by coding stripes of two colors (such as: red and blue). At this moment, the image acquisition device 20 obtains different stripe images through different CCD cameras. For example, a stripe image containing red and blue colors is obtained by a color CCD camera, and a stripe image containing a blue color is obtained by a monochrome CCD camera (a blue filter is arranged in front of the monochrome CCD camera). At this moment, the stripe image obtained by the color CCD camera is used for identifying and matching sequence codes of respective blue stripes. Then a three-dimensional reconstruction algorithm and a splicing fusion algorithm are performed according to the obtained sequence codes and the stripe image obtained by the monochrome CCD camera so as to construct a three-dimensional shape of the target object. It should be noted that the CCD camera is small in size and light in weight, is not affected by a magnetic field, and has anti-shock and anti-impact properties. Therefore, in the case where the three-dimensional scanner adopts a 2CCD camera to obtain a stripe image, the volume of the three-dimensional scanner can be reduced accordingly, so that the three-dimensional scanner is convenient for handheld use, and is applied in a small-space environment to be scanned (e.g.: oral cavity).

It should be noted that it is optional to arrange a light filter 22d of a specified color in front of the monochrome CCD camera, which is not specifically limited by the embodiments of the present application. However, if a light filter 22d of a specified color is arranged in front of the monochrome CCD camera, the monochrome CCD camera may obtain a stripe image of a specified color. At this moment, the inclusion of only a stripe image of a specified color would be more conducive to subsequently performing the three-dimensional reconstruction algorithm and the splicing fusion algorithm to construct a three-dimensional shape of the target object.

It should be noted that the present application does not specifically define the form of the camera, and a person skilled in the art would have been able to make corresponding replacements according to technical requirements. For example, the camera may be a CCD camera or a CMOS camera.

Optionally, in the three-dimensional scanner provided by embodiments of the present application, photosensitive bands configured by the image acquisition device 20 included in the three-dimensional scanner at least include a plurality of specified bands, and the plurality of specified bands correspond to stripe colors included in the color-coded stripe. That is, in an optional example, the image acquisition device 20 is provided with a color camera capable of acquiring a plurality of stripe colors in the color-coded stripes corresponding to the predetermined light in order to determine respective stripe sequences. The specified band in the present application may be a specified band or a plurality of specified bands.

Figure 3:
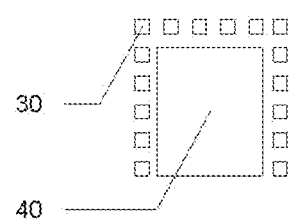
FIG. 3 is a schematic diagram of a positional relationship between an illumination member and a reflector according to an embodiment of the present application.

In addition, as shown in FIG. 3, the three-dimensional scanner may further include an illumination member 30. The illumination member 30 is configured to illuminate the target object so as to acquire a texture image of the target object subsequently. The illumination member 30 is preferably a white LED lamp, so as to realize true-color scanning, i.e. to obtain a three-dimensional model with the same color or basically the same color as the target object. The illumination member 30 may be arranged on the outer periphery of the reflector 40. The illumination member may also be arranged in other parts of the scanner, and is arranged in cooperation with the reflector 40. Illumination light is reflected to the target object through the reflector 40. For example, the illumination member 30 is located on a side of the first imaging lens 14 close to the light source emitter 12, and light projected by the illumination member and the light source emitter 12 may pass through the first imaging lens 14 and may be reflected onto the target object by the reflector 40. Specifically, the three-dimensional scanner includes a grip portion and an entrance portion arranged at a front end of the grip portion. The image projection device 10 and the image acquisition device 20 are both installed on the grip portion. The reflector 40 is installed on the entrance portion. The illumination member 30 may be installed on the entrance portion or may also be installed on the grip portion.

It should be noted that the image acquisition device 20 may identify and determine red light, green light and blue light, so that the image acquisition device 20 may acquire a texture image of the target object under the illumination light.

Optionally, in the three-dimensional scanner provided by embodiments of the present application, the three-dimensional scanner may further include a timing control circuit. The timing control circuit is connected to the image projection device 10, the illumination member 30 and the image acquisition device 20. The timing control circuit is configured to control the image projection device 10 to project light onto the target object, and synchronously control the image acquisition device 20 to obtain a plurality of stripe images. The timing control circuit is configured to control the illumination member 30 to illuminate the target object, and synchronously control the image acquisition device 20 to obtain a texture image. Preferably, the timing control circuit is configured to control the image projection device 10 and the illumination member 30 to alternately project light onto the target object.

Optionally, in the three-dimensional scanner provided by embodiments of the present application, the image acquisition device 20 further includes a beam processing device. The beam processing device includes a light input portion and at least two light output portions. The respective cameras 21 correspond to different light output portions. The image acquisition device 20 acquires the light modulated by the target object through the beam processing device.

Figure 4:
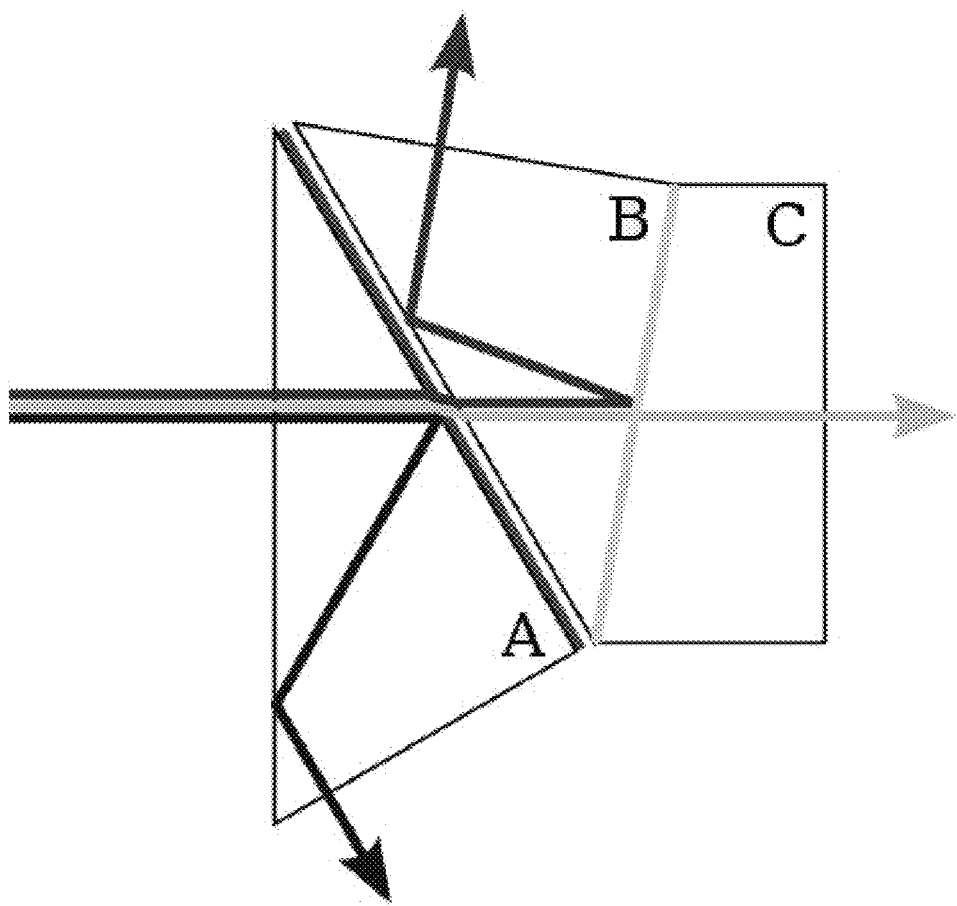
FIG. 4 is a schematic diagram of a beam path in a beam processing device according to an embodiment of the present application.

That is, the image acquisition device 20 is provided with the beam processing device so that the plurality of cameras 21 respectively obtain stripe patterns at completely consistent fields of view and angles. That is, the plurality of cameras 21 may receive coaxial light incident from the same second imaging lens 23. The coaxial light is projected onto the above plurality of cameras 21 respectively. Specifically, as shown in FIG. 4, image light of the target object enters the light input portion of the beam processing device. At this moment, the beam processing device separates the image light of the target object so that the image light is emitted out from the at least two light output portions respectively to be projected onto the plurality of cameras 21. At this moment, stripe images acquired by the plurality of cameras 21 are all stripe images obtained in the same perspective and based on the same modulated color-coded stripe. Stripe sequences in the respective stripe images are correlated based on the same modulated color-coded stripe, thereby facilitating three-dimensional reconstruction of the stripe images by subsequent algorithms.

In an optional example, the beam processing device further includes at least one first beam separation unit configured to separate light projected from the light input portion so that the light is projected from the at least two light output portions to the cameras 21 corresponding to the light output portions respectively. Specifically, the first beam separation unit separates light of each color into light in two directions. For example, a beam of red and blue light is processed by the first beam separation unit to form two beams of red and blue light, which are emitted out in different directions respectively.

That is, the beam processing device is provided with at least one first beam separation unit configured to separate light projected from the light input portion so that image light of the target object can be projected from the at least two light output portions respectively and the cameras 21 corresponding to the at least two light output portions can obtain stripe images in the same perspective.

In another optional example, the beam processing device further includes at least one second beam separation unit configured to separate light to be obtained by a specified camera so that the specified camera obtains light containing a specified band. Specifically, the second beam separation unit separates light of a partial band from the light, and the light of a partial band is emitted out in one direction. Alternatively, the second beam separation unit separates light of two partial bands from the light, and the light of two partial specified bands is emitted out in different directions respectively. For example, a beam of red and blue light is processed by the second beam separation unit to form a beam of blue light to be emitted out in one direction. Alternatively, a beam of red and blue light is processed by the second beam separation unit to form a beam of red light and a beam of blue light, which are emitted out in different directions respectively. The color-coded stripe includes a stripe of a color corresponding to the specified band.

That is, the beam processing device is provided with at least one second beam separation unit configured to separate light projected to the second beam separation unit so that light of a partial band in the projected light passes through the second beam separation unit while light of another partial band is reflected from the surface of the second beam separation unit (alternatively, the light of another partial band is absorbed by the second beam separation unit), and then the specified camera obtains light containing a specified band.

It should be noted that the specified camera is the monochrome camera.

Optionally, in the three-dimensional scanner provided by embodiments of the present application, the three-dimensional scanner may further include: a heat dissipation system, a heating anti-fog system, a software algorithm system, etc.

The heat dissipation system is configured to prevent damage to the scanner caused by overheating inside the three-dimensional scanning device.

The heating anti-fog system is configured to prevent failure to obtain accurate stripe images caused by the fogging phenomenon of each optical instrument in the three-dimensional scanner.

The software algorithm system is configured to perform three-dimensional reconstruction on the target object according to at least one stripe image obtained by the image acquisition device 20.

In order to enable those skilled in the art to understand the technical solutions of the present application more clearly, the following will be described with reference to specific embodiments.

Embodiment I

Taking FIG. 1 as an example, the beam processing device includes a partial-reflection partial-transmission prism 22c, and the partial-reflection partial-transmission prism 22c includes a first light output portion and a second light output portion. The beam processing device transmits and reflects light through the partial-reflection partial-transmission prism 22c, and thus separates light projected from the light input portion so that the light is respectively projected from the first light output portion and the second light output portion to the cameras 21 corresponding to the respective light output portions. Correspondingly, the image acquisition device 20 further includes a first camera 211 corresponding to the first light output portion, and a second camera 212 corresponding to the second light output portion. The first camera 211 generates a first stripe image based on the acquired light. The second camera 212 generates a second stripe image based on the acquired light. The first stripe image and the second stripe image include identifiable stripes of at least two colors.

In addition, the beam processing device further includes a light filter 22d. The beam processing device separates light to be obtained by a specified camera through the light filter 22d so that the specified camera obtains light containing a fifth filter band. At least one of the plurality of cameras is the specified camera.

Specifically, the light filter 22d is arranged between the first light output portion and the first camera 211 so that the first camera 211 obtains light of a fifth filter band, and/or, arranged between the second light output portion and the second camera 212 so that the second camera 212 obtains light of a fifth filter band.

It should be noted that in an example where the light filter 22d is arranged between the first light output portion and the first camera 211 so that the first camera 211 obtains light of a fifth filter band, stripes of two colors included in the first stripe image are a black stripe and a white stripe respectively. The white stripe is in the color-coded stripe, and a corresponding stripe color is a filter color corresponding to the light filter 22d.

At this moment, the color of at least one of stripes of at least two colors included in the second stripe image is the filter color corresponding to the light filter 22d, so that the second stripe image may identify coding sequences of the stripes included in the first stripe image.

Specifically, the first camera is a monochrome camera, and the second camera is a color camera. The monochrome camera corresponds to the light filter 22d. In an example where the image projection device 10 projects a red/green/blue color-coded stripe (i.e. color-coded stripe including red stripes, green stripes and blue stripes), the light filter 22d is preferably a blue light filter. The red/green/blue color-coded stripe is projected onto the target object by the image projection device 10, modulated by the target object, and then transferred to an image processing device. The red/green/blue color-coded stripe is separated by the partial-reflection partial-transmission prism 22c. One red/green/blue color-coded stripe is transmitted while the other red/green/blue color-coded stripe is reflected. After one red/green/blue color-coded stripe passes through the light filter 22d, blue light therein is acquired by the monochrome camera, and the monochrome camera generates a first stripe image including blue stripes. The other red/green/blue color-coded stripe is acquired by the color camera, and the color camera generates a second stripe image including red stripes, green stripes and blue stripes. The respective stripes in the first stripe image correspond to the blue stripes in the second stripe image, and the second stripe image is taken as a coding image. Specifically, since the second stripe image is acquired by the color camera, the red stripes, the green stripes and the blue stripes in the second stripe image are all identifiable and determinable, thereby determining coding sequences of the respective stripes in the second stripe image. The first stripe image is taken as a reconstruction image. The respective stripes of the first stripe image may be identified and matched by coding sequences of second stripes to realize three-dimensional reconstruction based on a stripe correspondence between the first stripe image and the second stripe image.

Certainly, the arrangement of the light filter 22d in front of the monochrome camera may also be eliminated. The first stripe image obtained by the monochrome camera includes red stripes, green stripes and blue stripes. Alternatively, a double-color light filter 22d is arranged in front of the monochrome camera for light of two colors of red, green and blue colors to be emitted out and acquired by the monochrome camera. The light filter 22d may also be arranged in front of the color camera. In an example where a red light filter is arranged in front of the color camera, the color camera generates a second stripe image including red stripes. The blue stripes in the first stripe image correspond to the blue stripes in the red/green/blue color-coded stripe, and the red stripes in the second stripe image correspond to the blue stripes in the red/green/blue color-coded stripe. Since a single-color light filter 22d is arranged in front of the monochrome camera for emission of light of only one color, the stripes in the first stripe image acquired by the monochrome camera may also be identified and determined. The first stripe image and the second stripe image may be combined to determine coding sequences of the respective stripes. The first stripe image and the second stripe image are both taken as coding images, and the first stripe image is taken as a reconstruction image. Alternatively, a double-color light filter 22d is arranged in front of the color camera. In an example where a red/green light filter 22d is arranged in front of the color camera, the color camera generates a second stripe image including red stripes and green stripes. The first stripe image and the second stripe image are both taken as coding images or only the second stripe image is taken as a coding image, and the first stripe image is taken as a reconstruction image.

In some embodiments, the image acquisition device 20 can only identify and determine two of red light, green light and blue light. In these embodiments, the image acquisition device 20 cannot completely obtain texture data of the target object under white light. In some embodiments, the image acquisition device 20 can identify and determine red light, green light and blue light, and may completely obtain texture data of the target object under white light, so as to obtain color three-dimensional data.

It is worth emphasizing that in this embodiment, the beam processing device separates light projected from the light input portion by transmitting and reflecting the light through the partial-reflection partial-transmission prism 22c so that the light is respectively projected from the first light output portion and the second light output portion to the cameras corresponding to the respective light output portions. That is, the beam processing device realizes the function corresponding to the first beam separation unit through the partial-reflection partial-transmission prism 22c.

Meanwhile, it is also worth emphasizing that in this embodiment, the beam processing device separates light to be obtained by a specified camera through the light filter 22d so that the specified camera obtains light containing a specified band. That is, the beam processing device realizes the function corresponding to the second beam separation unit through the light filter 22d.

Embodiment II

Figure 5:
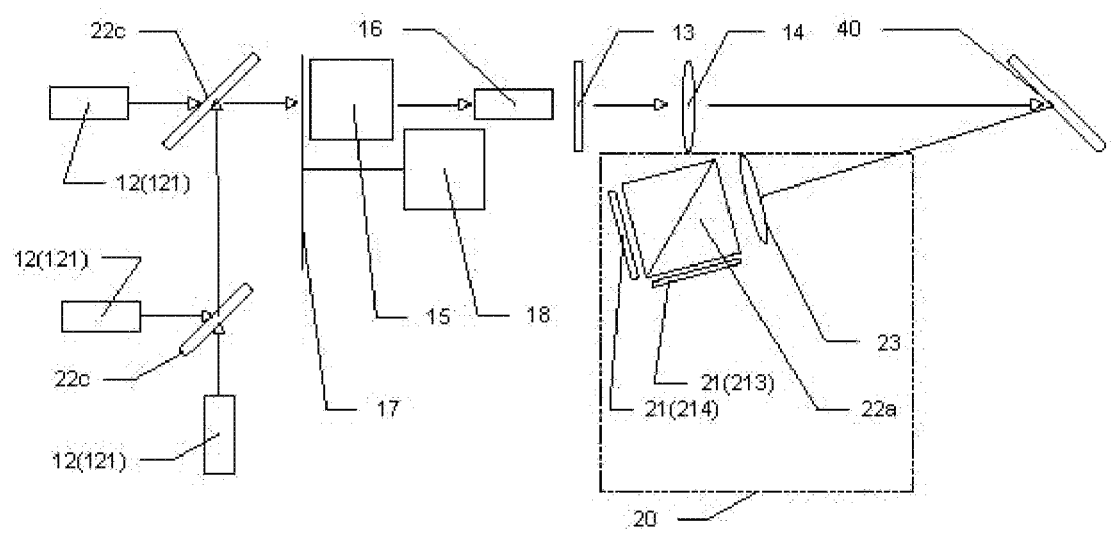
FIG. 5 is a schematic diagram II of an optional three-dimensional scanner according to an embodiment of the present application.

Taking FIG. 5 as an example, the beam processing device includes a right-angled two-channel dichroic prism 22a, and the right-angled two-channel dichroic prism 22a includes a third light output portion and a fourth light output portion. The beam processing device separates light projected from the light input portion through the right-angled two-channel dichroic prism 22a so that the light is respectively projected from the third light output portion and the fourth light output portion to cameras 21 corresponding to the respective light output portions. Correspondingly, the image acquisition device 20 includes a third camera 213 corresponding to the third light output portion, and a fourth camera 214 corresponding to the fourth light output portion. The third camera 213 generates a third stripe image based on the acquired light. The fourth camera 214 generates a fourth stripe image based on the acquired light. The third stripe image and the fourth stripe image both include identifiable stripes of at least two colors.

In addition, the beam processing device also separates light to be obtained by a specified camera through the right-angled two-channel dichroic prism 22a so that the specified camera obtains light containing a specified band. The operation of obtaining light containing a specified band by the specified camera includes: obtaining light of a first filter band by the third camera 213, and/or obtaining light of a second filter band by the fourth camera 214.

It should be noted that in an example where the beam processing device separates light to be obtained by a third camera 213 through the right-angled two-channel dichroic prism 22a so that the third camera 213 obtains light containing a first filter band, stripes of two colors included in the third stripe image are a black stripe and a white stripe respectively. The white stripe is in the color-coded stripe, and a corresponding stripe color is a filter color corresponding to the light filter 22d.

At this moment, the color of at least one of stripes of at least two colors included in the fourth stripe image is the filter color corresponding to the light filter 22d, so that the fourth stripe image may identify coding sequences of the stripes included in the third stripe image.

Specifically, the third camera is a monochrome camera, and the fourth camera is a color camera. In an example where the image projection device 10 projects a red/green/blue color-coded stripe (i.e. color-coded stripe including red stripes, green stripes and blue stripes), the red/green/blue color-coded stripe is projected onto the target object by the image projection device 10, modulated by the target object, and then transferred to an image processing device. The red/green/blue color-coded stripe is decomposed by the right-angled two-channel dichroic prism 22a into a red/green coded stripe and a blue coded stripe. The blue coded stripe is acquired by the monochrome camera, and the monochrome camera generates a third stripe image including blue stripes. The red/green coded stripe is acquired by the color camera, and the color camera generates a fourth stripe image including red stripes and green stripes. The blue stripes in the third stripe image correspond to the respective stripes in the fourth stripe image. Specifically, the third stripe image and the fourth stripe image are combined to correspond to the red/green/blue color-coded stripe, and the fourth stripe image is taken as a coding image. Specifically, since the fourth stripe image is acquired by the color camera, the red stripes and the green stripes in the fourth stripe image are all identifiable and determinable, thereby determining coding sequences of the respective stripes in the fourth stripe image. The third stripe image is taken as a reconstruction image. The respective stripes of the third stripe image may be identified and matched by coding sequences of fourth stripe image to realize three-dimensional reconstruction based on a stripe correspondence between the third stripe image and the fourth stripe image. Certainly, in the present embodiment, the monochrome camera obtains only single-color light. Therefore, the third stripe image may also be identified and determined. The third stripe image may be combined with the fourth stripe image to determine coding sequences of the respective stripes. The third stripe image and the fourth stripe image are both taken as coding images. In addition, the light filter 22d may be arranged or the light filter 22d may not be arranged in the present embodiment. The light filter 22d may be arranged in cooperation with the right-angled two-channel dichroic prism 22a.

It is worth emphasizing that in this embodiment, the beam processing device separates light projected from the light input portion through the right-angled two-channel dichroic prism 22a so that the light is respectively projected from the third light output portion and the fourth light output portion to the cameras 21 corresponding to the respective light output portions. That is, the beam processing device realizes the function corresponding to the first beam separation unit through the right-angled two-channel dichroic prism 22a.

Similarly, it is also worth emphasizing that in this embodiment, the beam processing device also separates light to be obtained by a specified camera through the right-angled two-channel dichroic prism 22a so that the specified camera obtains light containing a specified band. That is, the beam processing device realizes the function corresponding to the second beam separation unit through the right-angled two-channel dichroic prism 22a.

Embodiment III

Figure 6:
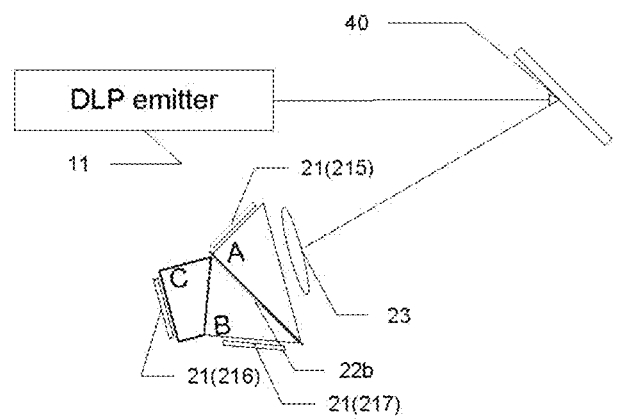
FIG. 6 is a schematic diagram III of an optional three-dimensional scanner according to an embodiment of the present application.

Taking FIG. 6 as an example, the beam processing device includes a three-channel dichroic prism 22b, and the three-channel dichroic prism 22b includes a fifth light output portion, a sixth light output portion, and a seventh light output portion. The beam processing device separates light projected from the light input portion through the three-channel dichroic prism 22b so that the light is respectively projected from the fifth light output portion, the sixth light output portion, and the seventh light output portion to cameras 21 corresponding to the respective light output portions.

Correspondingly, the image acquisition device 20 includes a fifth camera 215 corresponding to the fifth light output portion, a sixth camera 216 corresponding to the sixth light output portion, and a seventh camera 217 corresponding to the seventh light output portion. The fifth camera 215 generates a fifth stripe image based on the acquired light. The sixth camera 216 generates a sixth stripe image based on the acquired light. The seventh camera 217 generates a seventh stripe image based on the acquired light. The fifth stripe image, the sixth stripe image, and the seventh stripe image include identifiable stripes of at least two colors.

The beam processing device separates light to be obtained by a specified camera through the three-channel dichroic prism 22b so that the specified camera obtains light containing a specified band. The operation of obtaining light containing a specified band by the specified camera at least includes: obtaining light of a third filter band by the fifth camera 215, and obtaining light of a fourth filter band by the sixth camera 216, the third filter band being different from the fourth filter band.

At least one of the fifth camera, the sixth camera and the seventh camera is a monochrome camera. Specifically, the fifth camera is a monochrome camera, and the sixth camera and the seventh camera are color cameras. Alternatively, the fifth camera and the sixth camera are monochrome cameras, and the seventh camera is a color camera. Preferably, the above fifth camera 215, sixth camera 216 and seventh camera 217 are all monochrome cameras.

It should be noted that since photosensitive bands of the image acquisition device 20 of the present application correspond to stripe colors contained in a color-coded stripe one by one, in the case where the fifth camera 215, the sixth camera 216 and the seventh camera 217 are all monochrome cameras, there are three stripe colors contained in the color-coded stripe. At least two stripe colors have a corresponding relationship with the third filter band and the fourth filter band.

For example, the color-coded stripe is composed of red stripes, blue stripes and green stripes. At this moment, a filter color corresponding to a first filter face may be red, and a filter color corresponding to a second filter face may be blue. At this moment, the obtained fifth stripe image is a monochrome stripe image. White stripes correspond to the red stripes in the color-coded stripe. The obtained sixth stripe image is a monochrome stripe image. White stripes correspond to the blue stripes in the color-coded stripe.

For example, the color-coded stripe is composed of red stripes, blue stripes and yellow stripes. At this moment, a filter color corresponding to a first filter face may be red, and a filter color corresponding to a second filter face may be green. At this moment, the obtained fifth stripe image is a monochrome stripe image. White stripes correspond to the red stripes and the yellow stripes in the color-coded stripe (in the field of optics, yellow light is formed by combining green light and red light). The obtained sixth stripe image is a monochrome stripe image. White stripes correspond to the yellow stripes in the color-coded stripe (in the field of optics, yellow light is formed by combining green light and red light).

In an optional example, the beam processing device also separates light to be obtained by a specified camera through the three-channel dichroic prism 22b so that the seventh camera 217 obtains light of a sixth filter band and the sixth filter band is different from the third filter band and the fourth filter band.

For example, the color-coded stripe is composed of red stripes, blue stripes and green stripes. At this moment, a filter color corresponding to a first filter face may be red, a filter color corresponding to a second filter face may be blue, and a filter color corresponding to a third filter face may be green. At this moment, the obtained seventh stripe image is a monochrome stripe image. White stripes correspond to the green stripes in the color-coded stripe.

At this moment, any one of the fifth stripe image, the sixth stripe image and the seventh stripe image may be taken as a reconstruction image to perform three-dimensional reconstruction on the target object. For example, the fifth stripe image is taken as a reconstruction image to perform three-dimensional reconstruction on the target object, and the fifth stripe image, the sixth stripe image and the seventh stripe image are taken together as a coding image to determine the respective stripe sequences. In addition, preferably, the fifth stripe image, the sixth stripe image and the seventh stripe image are all taken as reconstruction images.

It is worth emphasizing that in this embodiment, the beam processing device separates light projected from the light input portion through the three-channel dichroic prism 22b so that the light is respectively projected from the fifth light output portion, the sixth light output portion and the seventh light output portion to the cameras 21 corresponding to the respective light output portions. That is, the beam processing device realizes the function corresponding to the first beam separation unit through the three-channel dichroic prism 22b.

Similarly, it is also worth emphasizing that in this embodiment, the beam processing device also separates light to be obtained by a specified camera through the three-channel dichroic prism 22b so that the specified camera obtains light containing a specified band. That is, the beam processing device realizes the function corresponding to the second beam separation unit through the three-channel dichroic prism 22b.

It should be noted that the above Embodiments I, II and III listed in the present application are all illustrative examples to enable a person skilled in the art to more clearly understand the technical solution of the present application. The present application is not specifically limited herein. If other specific devices may realize the functional definition description of the beam processing device in the present application, the devices may also serve as an executable technical solution of the present application.

In addition, it should also be noted that the above Embodiments I, II and III listed in the present application may all be combined with reference to each other to realize the functional definition description of the beam processing device in the present application. For example, in Embodiments II and III, after the beam processing device realizes the function corresponding to the second beam separation unit through the right-angled two-channel dichroic prism 22a or the three-channel dichroic prism 22b, the beam processing device may still continue to realize the function corresponding to the second beam separation unit again through the light filter.

In summary, by comparing the present scheme with the prior art, the beneficial effects of the present invention are as follows:

1. A stripe extraction algorithm based on spatial coding achieves the technical object of three-dimensional reconstruction of a target object with only one frame of two-dimensional image, and achieves the technical effect of reducing the frame rate of the cameras 21 and the operation cost of the algorithm.

2. By using colors as spatial coding information, the coding information is easily identified, and then the technical effect of improving the identification accuracy is achieved.

3. Based on the technical principle of the three-dimensional scanner of the present application, the three-dimensional scanner eliminates the requirements of dynamic projection, so that the three-dimensional scanner may also perform pattern projection processing by means of simple transmission projection. Further, in the case where the three-dimensional scanner performs pattern projection processing by means of transmission projection, the hardware cost is greatly reduced.

4. In the case where the three-dimensional scanner performs pattern projection processing using a laser as a light source, the brightness and depth of field of the image projection device 10 can be increased, and the technical effects of low cost, high brightness and high depth of field can be achieved.

That is, the three-dimensional scanner provided by the present application has the advantages of low hardware cost, low real-time frame rate requirements, high brightness and large depth of field of an optical system, and device miniaturization. Further, the three-dimensional scanner can directly perform dynamic real-time three-dimensional scanning with color texture on materials characterized by light reflection, transmission and diffusion such as intra-oral teeth and gums.

According to embodiments of the present application, a three-dimensional scanning system is provided. The three-dimensional scanning system includes:

a three-dimensional scanner, configured to project light onto a target object and acquire light modulated by the target object so as to obtain at least one stripe image in the case where light is projected onto the target object, where the projected light includes predetermined light projected in the form of a color-coded stripe that is formed by coding stripes of at least two colors; and an image processor, connected to the three-dimensional scanner, and configured to obtain at least one stripe image obtained by the three-dimensional scanner, and take the stripe image as a coding image to determine respective stripe sequences and as a reconstruction image to perform three-dimensional reconstruction on the target object.

It should be noted that the three-dimensional scanner included in the three-dimensional scanning system is the above three-dimensional scanner provided by the embodiments of the present application.

Optionally, in the case where the three-dimensional scanner acquires light modulated by the target object through a plurality of cameras so as to obtain at least one stripe image and the plurality of cameras include at least one monochrome camera, the image processor is further configured to: take a stripe image obtained by the at least one monochrome camera as a reconstruction image to perform three-dimensional reconstruction on the target object; and take stripe images obtained by at least a plurality of monochrome cameras as coding images to determine respective stripe sequences, and/or, take a stripe image obtained by at least one color camera as a coding image to determine respective stripe sequences.

According to the three-dimensional scanning system provided by the embodiments of the present application, a three-dimensional scanner projects light onto a target object and acquires light modulated by the target object so as to obtain at least one stripe image in the case where light is projected onto the target object. The projected light includes predetermined light projected in the form of a color-coded stripe that is formed by coding stripes of at least two colors. An image processor is connected to the three-dimensional scanner, and is configured to obtain at least one stripe image obtained by the three-dimensional scanner, and take the stripe image as a coding image to determine respective stripe sequences and as a reconstruction image to perform three-dimensional reconstruction on the target object. The technical problem that existing three-dimensional reconstruction methods in the related art are high in hardware cost and are thus not conducive to the promotion and use of a three-dimensional scanning device is thus solved.

It should be noted that the three-dimensional scanning system mentioned in the embodiments of the present application is to obtain a three-dimensional shape of a target object according to a stripe extraction algorithm based on spatial coding. Therefore, the three-dimensional scanning system needs only one frame of two-dimensional image to realize three-dimensional reconstruction of a target object, thereby greatly reducing the frame rate of a camera and the operation cost of an algorithm, and facilitating the promotion and use of the three-dimensional scanning system.

Specifically, since the three-dimensional scanning system does not need to use a camera with a high frame rate, the volume of the camera required in the three-dimensional scanning system can be reduced, thereby making the three-dimensional scanning system more suitable for obtaining a three-dimensional shape of an intra-oral object.

Moreover, based on the technical feature that the three-dimensional scanning system can realize three-dimensional reconstruction of the target object only with one frame of two-dimensional image at a minimum, an obtaining time difference between a reconstruction image and a texture image is greatly shortened, time required for projecting and photographing in the three-dimensional reconstruction of the target object is reduced, and likewise, the three-dimensional scanning system is more suitable for obtaining the three-dimensional shape of an intra-oral object (facilitating handheld scanning by the three-dimensional scanning system).

In addition, since the three-dimensional scanning system provided by the embodiments of the present application uses color as spatial coding information, the technical effects of facilitating identification of coding information and improving identification accuracy are also achieved.

In addition, the three-dimensional scanning system mentioned in the embodiments of the present application is to obtain a three-dimensional shape of a target object according to a stripe extraction algorithm based on spatial coding. Therefore, the technical effect of eliminating the projection requirements of dynamic projection is also achieved.

Embodiments of the present application also provide a three-dimensional scanning method. It should be noted that the three-dimensional scanning method in the embodiments of the present application is applied to the above three-dimensional scanner provided in the embodiments of the present application. The three-dimensional scanning method provided by the embodiments of the present application will be described below.

Figure 7:
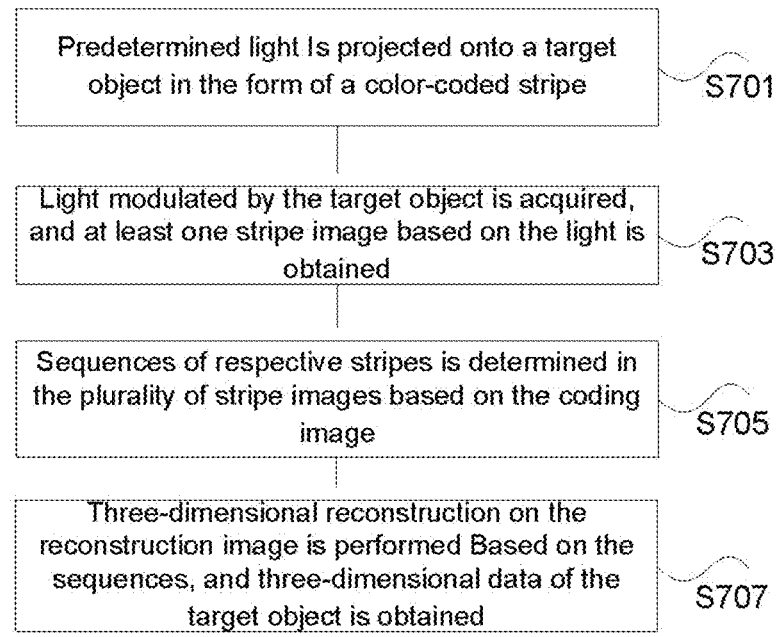
FIG. 7 is a flowchart I of an optional three-dimensional scanning method according to an embodiment of the present application.

FIG. 7 is a flowchart of a three-dimensional scanning method according to an embodiment of the present application. As shown in FIG. 7, the three-dimensional scanning method includes the following steps.

In step S701, predetermined light is projected onto a target object in the form of a color-coded stripe.

In step S703, light modulated by the target object is acquired, and at least one stripe image is obtained based on the light. The obtained stripe image is taken as a coding image to determine respective stripe sequences and as a reconstruction image to perform three-dimensional reconstruction on the target object.

In step S705, sequences of respective stripes in the plurality of stripe images are determined based on the coding image.

In step S707, three-dimensional reconstruction is performed on the reconstruction image based on the sequences, and three-dimensional data of the target object is obtained.

According to the three-dimensional scanning method provided by the embodiments of the present application, predetermined light is projected onto a target object in the form of a color-coded stripe. Light modulated by the target object is acquired, and at least one stripe image is obtained based on the light. The obtained stripe image is taken as a coding image to determine respective stripe sequences and as a reconstruction image to perform three-dimensional reconstruction on the target object. Sequences of respective stripes in the plurality of stripe images are determined based on the coding image. Three-dimensional reconstruction is performed on the reconstruction image based on the sequences, and three-dimensional data of the target object is obtained. The technical problem that existing three-dimensional reconstruction methods in the related art are high in hardware cost and are thus not conducive to the promotion and use of a three-dimensional scanning device is thus solved.

It should be noted that the three-dimensional scanning method mentioned in the embodiments of the present application is to obtain a three-dimensional shape of a target object according to a stripe extraction algorithm based on spatial coding. Therefore, the three-dimensional scanning method needs only one frame of two-dimensional image to realize three-dimensional reconstruction of a target object, thereby greatly reducing the frame rate of a camera and the operation cost of an algorithm, and facilitating the promotion and use of the three-dimensional scanning method. Specifically, since the three-dimensional scanning method does not need to use a camera with a high frame rate, the volume of the camera required in the three-dimensional scanning method can be reduced, thereby making the three-dimensional scanning method more suitable for obtaining a three-dimensional shape of an intra-oral object.

Moreover, based on the technical feature that the three-dimensional scanning method can realize three-dimensional reconstruction of the target object only with one frame of two-dimensional image at a minimum, an obtaining time difference between a reconstruction image and a texture image is greatly shortened, time required for projecting and photographing in the three-dimensional reconstruction of the target object is reduced, and likewise, the three-dimensional scanning method is more suitable for obtaining the three-dimensional shape of an intra-oral object (facilitating handheld scanning by the three-dimensional scanning method).

In addition, since the three-dimensional scanning method provided by the embodiments of the present application uses color as spatial coding information, the technical effects of facilitating identification of coding information and improving identification accuracy are also achieved.

In addition, the three-dimensional scanning method mentioned in the embodiments of the present application is to obtain a three-dimensional shape of a target object according to a stripe extraction algorithm based on spatial coding. Therefore, the technical effect of eliminating the projection requirements of dynamic projection is also achieved.

Optionally, in the three-dimensional scanning method provided by the embodiments of the present application, the three-dimensional scanning method further includes: obtaining texture data of the target object, and obtaining color three-dimensional data of the target object based on the three-dimensional data and the texture data of the target object.

Optionally, in the three-dimensional scanning method provided by the embodiments of the present application, the three-dimensional scanning method further includes: projecting illumination light onto a target object, and obtaining texture data of the target object based on the illumination light; and obtaining color three-dimensional data of the target object based on the three-dimensional data and the texture data of the target object.

Texture data is obtained by a single camera, or synthesized from data obtained by a plurality of cameras.

Specifically, in step S703, light modulated by the target object is acquired, and at least two stripe images are obtained based on the same light. At least one of the stripe images is obtained by a monochrome camera. The obtained stripe images are taken as a coding image to determine respective stripe sequences and as a reconstruction image to perform three-dimensional reconstruction on the target object. Preferably, the stripe image obtained by the monochrome camera is taken as the reconstruction image.

Specifically, in step S705, sequences of respective stripes in a plurality of stripe images are determined based on the coding image, and a coding sequence is determined based on arrangement information and color information of the respective stripes in the coding image. For example, if four stripes arranged in red, green, green, and red are coded and decoded by red (1, 0) and green (0, 1), the coding sequence thereof is (1, 0) (0, 1) (0, 1) (1, 0). For another example, five stripes arranged in red, blue, blue, green, and red are coded and decoded by red (1, 0, 0), green (0, 1, 0) and blue (0, 0, 1), the coding sequence thereof is (1, 0, 0), (0, 0, 1), (0, 0, 1), (0, 1, 0), (1,0,0).

Specifically, in step S707, the respective stripes of the reconstruction image are matched based on the coding sequences. For binocular reconstruction, in combination with the present embodiment in which there are two image acquisition devices, stripe matching is performed on reconstruction images of the two image acquisition devices, and point cloud reconstruction is performed after matching, so as to obtain three-dimensional data of a target object. For monocular reconstruction, in combination with the present embodiment in which there is one image acquisition device, stripe matching is performed on a reconstruction image of the image acquisition device and predetermined light of the image projection device, and point cloud reconstruction is performed after matching, so as to obtain three-dimensional data of a target object.

FIG. 8 is a flowchart of a three-dimensional scanning method according to an embodiment of the present application. As shown in FIG. 8, the three-dimensional scanning method includes the following steps.

In step S801, a first image and a second image are obtained. The first image and the second image are stripe images obtained based on a same beam.

In step S803, coding sequences of respective stripes are determined based on the first image.

In step S805, stripes of the second image are matched based on the coding sequences to realize three-dimensional reconstruction so as to obtain three-dimensional data of a target object.

The three-dimensional scanning method further includes the following steps.

In step S807, texture data is obtained, and color three-dimensional data of the target object is obtained based on the three-dimensional data and the texture data.

Preferably, the first image (second image) and the texture data are obtained alternately.

The following situations are illustrated with specific methods.

An image projection device projects a red/green/blue color-coded stripe onto a target object at a first moment. The red/green/blue color-coded stripe is modulated by the target object and then transferred to an image processing device. The red/green/blue color-coded stripe is separated into two red/green/blue color-coded stripes through a partial-reflection partial-transmission prism. One of the red/green/blue color-coded stripes is acquired by a color camera, and the color camera generates a corresponding red/green/blue color-coded stripe image. The other red/green/blue color-coded stripe is acquired by a monochrome camera through a blue light filter, and the monochrome camera generates a corresponding blue stripe image. An illumination member emits white light to the target object at a second moment. The white light is reflected by the target object and then acquired by the color camera, and the color camera generates a texture image. A coding sequence of each stripe is determined based on the red/green/blue color-coded stripe image. The respective stripes of the blue stripe image are matched based on the coding sequence. Three-dimensional reconstruction is realized to obtain three-dimensional data of the target object. True-color three-dimensional data of the target object is obtained based on the three-dimensional data and the texture image.

An image projection device projects a red/green/blue color-coded stripe to a target object at a first moment. The red/green/blue color-coded stripe is modulated by the target object and then transferred to an image processing device. The red/green/blue color-coded stripe is separated into two red/green/blue color-coded stripes through a partial-reflection partial-transmission prism. One of the red/green/blue color-coded stripes is acquired by a color camera, and the color camera generates a corresponding red/green/blue color-coded stripe image. The image projection device projects a blue coded stripe onto the target object at a third moment. The blue coded stripe is modulated by the target object and then transferred to the image processing device. The blue coded stripe sequentially passes through the partial-reflection partial-transmission prism and a blue light filter and is acquired by a monochrome camera, and the monochrome camera generates a corresponding blue stripe image. The blue coded stripe corresponds to blue stripes in the red/green/blue color-coded stripe. An illumination member emits white light to the target object at a second moment. The white light is reflected by the target object and then acquired by the color camera, and the color camera generates a texture image. A coding sequence of each stripe is determined based on the red/green/blue color-coded stripe image. The respective stripes of the blue stripe image are matched based on the coding sequence. Three-dimensional reconstruction is realized to obtain three-dimensional data of the target object. True-color three-dimensional data of the target object is obtained based on the three-dimensional data and the texture image.

An image projection device projects a red/green/blue color-coded stripe onto a target object at a first moment. The red/green/blue color-coded stripe is modulated by the target object and then transferred to an image processing device. The red/green/blue color-coded stripe is decomposed into a red/green stripe and a blue stripe by a right-angled two-channel dichroic prism. The red/green stripe is acquired by a color camera, and the color camera generates a corresponding red/green stripe image. The blue stripe is acquired by a monochrome camera, and the monochrome camera generates a corresponding blue stripe image. An illumination member emits white light to the target object at a second moment. The white light is reflected by the target object and then acquired by the color camera and the monochrome camera, the color camera generates a texture image based on red light and green light, and the monochrome camera generates a texture image based on blue light. A coding sequence of each stripe is determined based on the red/green stripe image. The respective stripes of the blue stripe image are matched based on the coding sequence. Three-dimensional reconstruction is realized to obtain three-dimensional data of the target object. A texture image based on white light is synthesized based on the texture image of the color camera and the texture image of the monochrome camera. True-color three-dimensional data of the target object is obtained based on the three-dimensional data and the texture image of the white light.

An image projection device projects a red/green/blue color-coded stripe onto a target object at a first moment. The red/green/blue color-coded stripe is modulated by the target object and then transferred to an image processing device. The red/green/blue color-coded stripe is decomposed into a red stripe, a green stripe and a blue stripe by a three-channel dichroic prism. The red stripe is acquired by a first monochrome camera, and the first monochrome camera generates a corresponding red stripe image. The green stripe is acquired by a second monochrome camera, and the second monochrome camera generates a corresponding green stripe image. The blue stripe is acquired by a third monochrome camera, and the third monochrome camera generates a corresponding blue stripe image. An illumination member emits white light to the target object at a second moment. The white light is reflected by the target object and then acquired by the three monochrome cameras. The first monochrome camera generates a texture image based on red light, the second camera generates a texture image based on green light, and the third monochrome camera generates a texture image based on blue light. A coding sequence of each stripe is determined based on the combination of the red stripe image, the green stripe image and the blue stripe image. The respective stripes of the red stripe image, the green stripe image and the blue stripe image are matched based on the coding sequence. Three-dimensional reconstruction is realized to obtain three-dimensional data of the target object. A texture image based on white light is synthesized based on the texture images of the three monochrome cameras. True-color three-dimensional data of the target object is obtained based on the three-dimensional data and the texture image of the white light. An image projection device projects a green/blue color-coded stripe onto a target object at a first moment. The green/blue color-coded stripe is modulated by the target object and then transferred to an image processing device. The green/blue color-coded stripe is decomposed into a green stripe and a blue stripe by a three-channel dichroic prism. The green stripe is acquired by a second monochrome camera, and the second monochrome camera generates a corresponding green stripe image. The blue stripe is acquired by a third monochrome camera, and the third monochrome camera generates a corresponding blue stripe image. An illumination member emits white light to the target object at a second moment. The white light is reflected by the target object and then acquired by the three monochrome cameras. The first monochrome camera generates a texture image based on red light, the second monochrome camera generates a texture image based on green light, and the third monochrome camera generates a texture image based on blue light. A coding sequence of each stripe is determined based on the combination of the green stripe image and the blue stripe image. The respective stripes of the green stripe image and the blue stripe image are matched based on the coding sequence. Three-dimensional reconstruction is realized to obtain three-dimensional data of the target object. A texture image based on white light is synthesized based on the texture images of the three monochrome cameras. True-color three-dimensional data of the target object is obtained based on the three-dimensional data and the texture image of the white light.

It should be noted that the steps shown in the flowcharts of the drawings may be performed in a computer system, such as a set of computer-executable instructions, and that, although a logical order is shown in the flowcharts, the steps shown or described may be performed in an order other than that described herein in some instances.

Embodiments of the present invention provide a storage medium having, stored thereon, a program which, when executed by a processor, implements the three-dimensional scanning method.

Embodiments of the present invention provide a processor for running a program. The program, when run, performs the three-dimensional scanning method.

According to embodiments of the present application, a three-dimensional scanner is provided.

FIG. 9 is a schematic diagram of a three-dimensional scanner according to an embodiment of the present application. As shown in FIG. 9, the three-dimensional scanner includes an image projection device 10 and an image acquisition device 20.

The image projection device 10 is configured to respectively project, in each predetermined period, a predetermined stripe pattern corresponding to the predetermined period onto a target object. Stripes of each predetermined stripe pattern are disposed according to arrangement of predetermined color-coded stripes. Each predetermined stripe pattern includes stripes of at least one color in the predetermined color-coded stripes, and a plurality of predetermined stripe patterns include stripes of at least two colors in the predetermined color-coded stripes. The stripes in the predetermined stripe patterns are arranged in the same way as stripes of the same color in the predetermined color-coded stripes.

It should be noted that the operation of projecting, in each predetermined period, a predetermined stripe pattern corresponding to the predetermined period onto the target object may be that: the image projection device 10 periodically projects a predetermined stripe pattern. The image projection device 10 projects a plurality of predetermined stripe patterns in each predetermined period. The plurality of predetermined stripe patterns are projected at different time periods. For example, the image projection device 10 projects a first predetermined stripe pattern at a first time period and a second predetermined stripe pattern at a second time period. The image acquisition device 20 acquires the first predetermined stripe pattern at the first time period and the second predetermined stripe pattern at the second time period. The image acquisition device 20 repeats this process until the scanning of the target object is completed.

Figure 10:
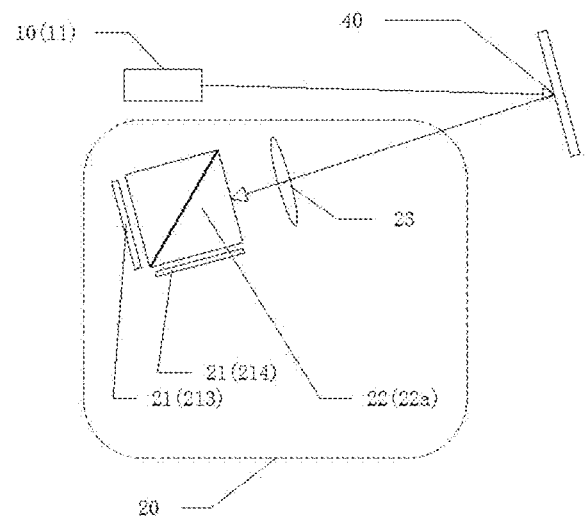
FIG. 10 is a schematic diagram V of an optional three-dimensional scanner according to an embodiment of the present application.

In an optional example, as shown in FIG. 10, the image projection device 10 further includes a DLP projection portion 11. The image projection device 10 respectively projects, in each predetermined period, a plurality of predetermined stripe patterns corresponding to the predetermined period onto the target object through the DLP projection portion 11.

That is, the image projection device 10 may realize the function through the DLP projection portion 11.

Specifically, the DLP projection portion 11 respectively projects, in each predetermined period, a plurality of predetermined stripe patterns corresponding to the predetermined period onto a target object. Stripes of each predetermined stripe pattern are disposed according to arrangement of predetermined color-coded stripes. Each predetermined stripe pattern includes stripes of at least one color in the predetermined color-coded stripes, and the plurality of predetermined stripe patterns include stripes of at least two colors in the predetermined color-coded stripes. The stripes in the predetermined stripe patterns are arranged in the same way as stripes of the same color in the predetermined color-coded stripes.

In an optional example, the image projection device 10 further includes: a light emitting portion 12, configured to respectively emit, in each predetermined period, a plurality of beams of initial light corresponding to the predetermined period, wherein each beam of the initial light is composed of light of at least one stripe color, and the stripe color is the color of stripes in the predetermined color-coded stripes; and a light transmitting portion 13, arranged on a transfer path of the initial light, wherein after each beam of the initial light is transmitted by patterns of predetermined color-coded stripes on the light transmitting portion 13, respective corresponding predetermined color stripes are generated, i.e. predetermined stripe patterns are projected onto a target object, and stripes in the predetermined stripe patterns are arranged in the same way as stripes of the same color in the predetermined color-coded stripes.

It should be noted that the predetermined color-coded stripe is a predetermined arrangement standard for respective color stripes. In the present application, predetermined stripe patterns complying with the predetermined arrangement standard for respective color stripes may be directly projected through the DLP projection portion 11. Alternatively the light transmitting portion 13 may be taken as a carrier of the predetermined arrangement standard for respective color stripes, i.e. the light transmitting portion 13 determines the predetermined arrangement standard for respective color stripes, and initial light passes through the light transmitting portion and then generates predetermined stripe patterns arranged according to the predetermined arrangement standard for respective color stripes.

That is, the image projection device 10 may realize the function through the light emitting portion 12 and the light transmitting portion 13.

Specifically, the three-dimensional scanner may form different predetermined stripe patterns by means of transmission projection and project the predetermined stripe patterns onto the target object, and stripes of each of the generated predetermined stripe patterns are disposed according to arrangement of predetermined color-coded stripes on the light transmitting portion 13. Each predetermined stripe pattern includes stripes of at least one color in the predetermined color-coded stripes, and a plurality of predetermined stripe patterns include stripes of at least two colors in the predetermined color-coded stripes. The stripes in the predetermined stripe patterns are arranged in the same way as stripes of the same color in the predetermined color-coded stripes.

Optionally, the light emitting portion 12 further includes a plurality of light source units 121. Bands of light emitted by all the light source units 121 are different. The light emitting portion 12 emits the initial light through the plurality of light source units 121. The initial light may be single-band light emitted by only a single light source unit 121, or may be multi-band light emitted simultaneously by a plurality of light source units 121.

For example, as shown in FIG. 9, the light emitting portion 12 includes three light source units 121, and bands of light emitted by all the light source units 121 are different. For example, the first light source unit 121 emits light of a band of 605-700, i.e. red light. The second light source unit 121 emits light of a band of 435-480, i.e. blue light. The third light source unit 121 emits light of a band of 500-560, i.e. green light.

The first light source unit 121 emits light of a band of 605-700 at a time period A of a predetermined period. The second light source unit 121 emits light of a band of 435-480 at a time period B of the predetermined period. The first light source unit 121 emits light of a band of 605-700 at a time period C of the predetermined period, the second light source unit 121 emits light of a band of 450-480, and meanwhile, the third light source unit 121 emits light of a band of 500-560.

Alternatively, the first light source unit 121 emits light of a band of 605-700 at a time period A of a predetermined period. The second light source unit 121 emits light of a band of 450-480 at a time period B of the predetermined period. The third light source unit 121 emits light of a band of 500-560 at a time period C of the predetermined period.

It should be noted that the above settings of the first light source unit 121, the second light source unit 121 and the third light source unit 121 are illustrative examples, and are not specific limitations on the band of light which can be emitted by the light source units 121. In addition to the above illustrative examples, the band of light which can be emitted by the light source units 121 may be arbitrarily selected. The present application does not specifically limit that.

It should also be noted that the above settings of the light source units 121 operated in the predetermined periods A, B and C are illustrative examples, and are not specific limitations on the light source units 121 capable of emitting light in each predetermined period. In addition to the above illustrative examples, the light source units 121 which can be started in each predetermined period may be arbitrarily selected. The present application does not specifically limit that.

Optionally, the light source unit 121 may include at least one of an LED light source and a laser emitter.

That is, the light source unit 121 may realize the function through the laser emitter and may realize the function through the LED light source. Laser light has the advantages of directed light emission, extremely high brightness, extremely pure color, and good coherence.

Specifically, the light emitting portion 12 further includes a plurality of LED light sources. Bands of light emitted by all the LED light sources are different. The light emitting portion 12 emits the initial light through the plurality of LED light sources.

Specifically, the light emitting portion 12 further includes a plurality of laser emitters. Bands of light emitted by all the laser emitters are different. The light emitting portion 12 emits the initial light through the plurality of laser emitters.

Optionally, the light emitting portion 12 further includes a light aggregation unit. The light aggregation unit is arranged on a transfer path of light emitted from the plurality of light source units 121. The light emitted from the plurality of light source units 121 is aggregated by the light aggregation unit and then projected to the light transmitting portion 13 on the same transfer path.

That is, the initial light is a combination of light projected to the light transmitting portion 13 on the same transfer path after being aggregated by the light aggregation unit. The light aggregation unit may realize the function through the partial-reflection partial-transmission prism 22c.

For example, as shown in FIG. 9, the light emitting portion 12 includes three light source units 121, and bands of light emitted by all the light source units 121 are different. A first partial-reflection partial-transmission prism 22c is arranged on light paths of the first light source unit 121 and the second light source unit 121. The first partial-reflection partial-transmission prism 22c is configured to aggregate light emitted by the first light source unit 121 and the second light source unit 121 so that the light is projected onto a second partial-reflection partial-transmission prism 22c. The third light source unit 121 is arranged on a side of the second partial-reflection partial-transmission prism 22c away from the aggregated light. The light emitted from the third light source unit 121 and the aggregated light are aggregated by the second partial-reflection partial-transmission prism 22c to generate a combination of light projected to the light transmitting portion 13 on the same transfer path.

Optionally, the light transmitting portion 13 further includes a grating. Specifically, the light transmitting portion 13 generates a predetermined stripe pattern through the grating for projection onto the target object.

Specifically, different regions are arranged on the grating, and the different regions correspond to different bands, i.e. different regions may transmit light of different bands. The different regions on the grating determine predetermined color-coded stripes. It can also be understood that the respective regions on the grating are arranged in the same way as respective stripes in the predetermined color-coded stripes, and the bands corresponding to the respective regions correspond to stripe colors corresponding to the stripes arranged in the same way. For example, the grating includes a first region for transmitting light of a first band and a second region for transmitting light of a second band. The light of the first band passes through the grating and forms stripes of the first band arranged in the same way as the first region. The light of the second band passes through the grating and forms stripes of the second band arranged in the same way as the second region.

That is, the light emitting portion 12 emits different beams of initial light at different time periods of a predetermined period. At this moment, when a certain beam of initial light is projected onto the grating, light of various colors is transmitted through the respective regions to form a predetermined stripe pattern.

It should be noted that in the case where the light emitting portion 12 emits initial light through the plurality of laser emitters, the light emitting portion 12 may further include a phase modulation unit. The phase modulation unit is arranged on a transfer path of the initial light so that the initial light is projected to the light transmitting portion 13 after diffraction spots are removed by the phase modulation unit.

Specifically, the phase modulation unit may include a phase modulation element and a beam coupling element. The phase modulation element is arranged on the transfer path of the initial light, and the phase modulation element rotates around a predetermined axis. The transfer path of the initial light is parallel to the predetermined axis of the phase modulation element. The beam coupling element is arranged on the transfer path of the initial light for collimating and adjusting the initial light and reducing the divergence angle of the initial light.

The phase modulation element may be in any one of the following forms: a thin sheet made of a transparent optical material, a micro-optical element, or a random phase plate. Moreover, the phase modulation unit further includes a drive motor. The phase modulation element is driven by the drive motor to rotate at a certain speed around a rotation axis.

The beam coupling element may be composed of a collimating system and a converging lens, or an optical system having an equivalent function thereto.

The phase modulation element may be located in front of the beam coupling element or may also be located behind the beam coupling element.

It should be noted that in the case where the light emitting portion 12 emits initial light through the plurality of light source units 121, the light emitting portion 12 may further include a solid medium element. The solid medium element is arranged on the transfer path of the initial light. After being reflected and mixed repeatedly by the solid medium element, the initial light is projected to the light transmitting portion 13 in the form of uniform light field intensity.

Specifically, the solid medium element may be in any one of the following forms: an elongated hexahedral prism, a cylindrical prism, and a pyramidal prism. Meanwhile, the solid medium element may be a hollow bar for repeatedly reflecting light in a space defined by a solid interface, or a solid bar for repeatedly reflecting light inside a solid transparent medium. Input end and output end faces of the solid bar are each coated with an anti-reflection film, and an internal surface of the hollow bar is coated with a high reflection film. In addition, an emergent end face of the solid medium element is parallel to an incident end face of the solid medium element.

Optionally, the three-dimensional scanner further includes a timing control portion. The timing control portion is connected to the image projection device 10 and the image acquisition device 20, and is configured to control the image projection device 10 to respectively emit, in each predetermined period, a predetermined stripe pattern corresponding to the predetermined period, and to control the image acquisition device 20 to respectively acquire light modulated by the target object in a plurality of predetermined periods so as to obtain a stripe image corresponding to each of the predetermined stripe patterns.

That is, the three-dimensional scanner controls, through the timing control portion, the image projection device 10 to respectively emit, in each predetermined period, a predetermined stripe pattern corresponding to the predetermined period, and controls the image acquisition device 20 to respectively acquire light modulated by the target object in a plurality of predetermined periods so as to obtain a stripe image corresponding to each of the predetermined stripe patterns.

That is, the three-dimensional scanner matches the processes of the image projection device 10 and the image acquisition device 20 through the timing control portion.

Optionally, the three-dimensional scanner further includes a timing control portion. The timing control portion is connected to the plurality of light source units 121 and the image acquisition device 20, and is configured to control the plurality of light source units 121 to respectively emit light in different predetermined periods so as to respectively generate, in each predetermined period, initial light corresponding to the predetermined period, and to control the image acquisition device 20 to respectively acquire light modulated by the target object in a plurality of predetermined periods so as to obtain a stripe image corresponding to each beam of the initial light.

That is, the three-dimensional scanner controls, through the timing control portion, the plurality of light source units 121 to respectively emit light in different predetermined periods so as to generate a predetermined stripe pattern corresponding to each predetermined period and projected onto the target object, and to control the image acquisition device 20 to respectively acquire light modulated by the target object in a plurality of predetermined periods so as to obtain a stripe image corresponding to each beam of the initial light.

That is, the three-dimensional scanner matches the processes of the plurality of light source units 121 and the image acquisition device 20 through the timing control portion.

It should be noted that the above two timing control portions may be optional examples of the present application. That is, the three-dimensional scanning device in the present application includes a first timing control portion or a second timing control portion. The first timing control portion is connected to the image projection device 10 and the image acquisition device 20, and is configured to control the image projection device 10 to respectively emit, in each predetermined period, a predetermined stripe pattern corresponding to the predetermined period, and to control the image acquisition device 20 to respectively acquire light modulated by the target object in a plurality of predetermined periods so as to obtain a stripe image corresponding to each of the predetermined stripe patterns. The second timing control portion is connected to the plurality of light source units 121 and the image acquisition device 20, and is configured to control the plurality of light source units 121 to respectively emit light in different predetermined periods so as to respectively generate, in each predetermined period, initial light corresponding to the predetermined period, and to control the image acquisition device 20 to respectively acquire light modulated by the target object in a plurality of predetermined periods so as to obtain a stripe image corresponding to each beam of the initial light.

Optionally, the three-dimensional scanner further includes an illumination member 30. The image acquisition device 20 is further configured to acquire illumination light reflected by the target object to obtain texture data of the target object in the case where the target object is illuminated by the illumination member 30.

Further, in the case where the three-dimensional scanner further includes an illumination member 30, the image acquisition device 20 may identify and determine red light, blue light and green light, so that the image acquisition device 20 acquires, in the case where illumination light is projected onto a target object by the illumination member 30, a texture image of the target object, and generates a three-dimensional model consistent with (or substantially consistent with) the target object in color through the texture image and the three-dimensional data, i.e. realizing true-color scanning.

For example, the above illumination member 30 may be an LED lamp emitting white light. If the image projection device 10 includes a DLP projection portion 11, it is sufficient to project illumination light through the DLP projection portion 11, i.e. the image projection device 10 and the illumination member 30 are an integrated device.

Further, in the case where the three-dimensional scanner further includes an illumination member 30, the timing control portion is further connected to the illumination member 30 for controlling the illumination member 30 to project illumination light to a target object and controlling the image acquisition device 20 to acquire a texture image of the target object in the case where illumination light is projected onto the target object by the illumination member 30.

Further, in the case where the three-dimensional scanner further includes an illumination member 30 and the timing control portion is further connected to the illumination member 30, the timing control portion is configured to control the image projection device 10 and the illumination member 30 to alternately project a predetermined stripe pattern and illumination light onto a target object, and the timing control portion is configured to control the image acquisition device 20 to synchronously acquire the predetermined stripe pattern with respect to the image projection device 10 and to control the image acquisition device 20 to synchronously acquire a texture image with respect to the illumination member 30. Alternatively, the timing control portion is configured to control the plurality of light source units 121 and the illumination member 30 to alternately project a predetermined stripe pattern and illumination light onto a target object, and the timing control portion is configured to control the image acquisition device 20 to synchronously acquire the predetermined stripe pattern with respect to the image projection device 10 and to control the image acquisition device 20 to synchronously acquire a texture image with respect to the illumination member 30.

Optionally, the three-dimensional scanner further includes a reflector 40. The reflector 40 is configured to change a transfer path of light.

For example, the reflector 40 is arranged on a transfer path of a predetermined stripe pattern. Specifically, the predetermined stripe pattern is reflected onto the target object by the reflector 40, and then is reflected to the image acquisition device 20 after being modulated by the target object. At this moment, the installation constraint of the image projection device 10 and the image acquisition device 20 can be reduced, and the size of space required for the image projection device 10 and the image acquisition device 20 can be reduced.

For example, the reflector 40 is arranged on a transfer path of light emitted by the plurality of light source units 121. Specifically, the reflector 40 is configured to change the transfer path of the light emitted by the plurality of light source units 121 so as to reduce the installation constraint of the plurality of light source units 121 and reduce the size of space required for the plurality of light source units 121.

Optionally, in the case where the three-dimensional scanner further includes an illumination member 30 and a reflector 40 and the reflector 40 is arranged on a transfer path of a predetermined stripe pattern, as shown in FIG. 3, the illumination member 30 may be arranged on the outer periphery of the reflector 40, or may also be arranged in other parts of the scanner and arranged in cooperation with the reflector 40. Illumination light is reflected to the target object through the reflector 40. For example, the illumination member 30 is arranged on a side of the first imaging lens 14 close to the light source unit 121, and light projected by the illumination member and the light source unit 121 can pass through the first imaging lens 14 and can be reflected to the target object by the reflector 40.

For example, the three-dimensional scanner includes a grip portion and an entrance portion arranged at a front end of the grip portion. The image projection device 10 and the image acquisition device 20 are both installed on the grip portion. The reflector 40 is installed on the entrance portion. The illumination member 30 may be installed on the entrance portion or may also be installed on the grip portion.

The image acquisition device 20 is configured to acquire light modulated by the target object so as to obtain a plurality of stripe images in the case where predetermined stripe patterns are projected onto the target object. The obtained stripe images are taken as coding images to determine respective stripe sequences and as reconstruction images to perform three-dimensional reconstruction on the target object, so as to generate three-dimensional data of the target object.

That is, in the case where a predetermined stripe pattern is projected onto the target object, the projected predetermined stripe pattern will be mapped on the target object, and the predetermined stripe pattern will be deformed (i.e. modulated) based on the shape of the target object. At this moment, the image acquisition device 20 acquires the above deformed predetermined stripe pattern, and then obtains a stripe image. The stripe image is used for determining respective stripe sequences and performing three-dimensional reconstruction on the target object.

In an optional example, the image acquisition device 20 further includes a plurality of cameras 21. The plurality of cameras 21 include at least one monochrome camera 21. The image acquisition device 20 acquires light modulated by the target object through the plurality of cameras 21 to obtain a plurality of stripe images. A stripe image obtained by the at least one monochrome camera 21 is taken as a reconstruction image to perform three-dimensional reconstruction on the target object. Moreover, stripe images obtained by at least a plurality of monochrome cameras 21 are taken as coding images to determine respective stripe sequences, and/or, a stripe image obtained by at least one color camera 21 is taken as a coding image to determine respective stripe sequences.

That is, the image acquisition device 20 acquires light modulated by the target object through the plurality of cameras 21 so as to obtain a plurality of stripe images, and the above plurality of cameras 21 include at least one monochrome camera 21. A stripe image obtained by the at least one monochrome camera 21 is taken as a reconstruction image to perform three-dimensional reconstruction on the target object.

It should be noted that the imaging resolution of the monochrome camera 21 is higher than that of the color camera 21. Therefore, the plurality of cameras 21 include at least one monochrome camera 21, and a stripe image generated by the monochrome camera 21 is used for three-dimensional reconstruction, thereby improving the accuracy of the three-dimensional reconstruction of the target object.

Specifically, the operation of taking a stripe image obtained by the at least one monochrome camera 21 as a reconstruction image to perform three-dimensional reconstruction on the target object includes: taking a stripe image obtained by one monochrome camera 21 as a reconstruction image to perform three-dimensional reconstruction on the target object; taking stripe images obtained by a plurality of monochrome cameras 21 as reconstruction images to perform three-dimensional reconstruction on the target object; taking stripe images obtained by one monochrome camera 21 and at least one color camera 21 as reconstruction images to perform three-dimensional reconstruction on the target object; and taking stripe images obtained by a plurality of monochrome cameras 21 and at least one color camera 21 as reconstruction images to perform three-dimensional reconstruction on the target object.

Specifically, the operation of taking stripe images obtained by at least a plurality of monochrome cameras 21 as coding images to determine respective stripe sequences and/or taking a stripe image obtained by at least one color camera 21 as a coding image to determine respective stripe sequences includes: taking stripe images obtained by a plurality of monochrome cameras 21 as coding images to determine respective stripe sequences; taking a stripe image obtained by at least one color camera 21 as a coding image to determine respective stripe sequences; and taking stripe images obtained by at least one color camera 21 and at least one monochrome camera 21 as coding images to determine respective stripe sequences.

That is, stripe information contained in at least one stripe image as a coding image needs to determine coding sequences of respective stripes. That is, the coding image is composed of stripe images capable of determining the coding sequences of the respective stripes.

Optionally, the camera 21 may be a CDD camera or a CMOS camera. Specifically, the present application does not specifically define the form of the camera, and a person skilled in the art would have been able to make corresponding replacements according to technical requirements.

It should be noted that the CCD camera is small in size and light in weight, is not affected by a magnetic field, and has anti-shock and anti-impact properties. Therefore, in the case where the three-dimensional scanner adopts a 2CCD camera to obtain a stripe image, the volume of the three-dimensional scanner can be reduced accordingly, so that the three-dimensional scanner is convenient for handheld use, and is applied in a small-space environment to be scanned (e.g.: oral cavity).

For example, a pre-designed predetermined stripe image A is projected onto a target object by the image projection device 10 at a time period a of a predetermined period, a pre-designed predetermined stripe image B is projected onto the target object at a time period b of the predetermined period, and the image acquisition device 20 is controlled to rapidly acquire an image of the target object with a predetermined stripe image. The cameras 21 included in the image acquisition device 20 respectively acquire different stripe images. For example, the camera 21 is a color camera 21 for obtaining a color stripe image in the case where a predetermined stripe pattern A is projected onto the target object, and the camera 21 is a monochrome camera 21 for obtaining a monochrome stripe image in the case where a predetermined stripe pattern B is projected onto the target object.

At this moment, the color stripe image and the monochrome stripe image are transferred to a computer terminal. The computer takes the color stripe image as coding information and the monochrome stripe image as a reconstruction image so as to obtain a three-dimensional shape of the target object.

In an optional example, the image acquisition device 20 further includes a beam processing device 22. The beam processing device 22 includes a light input portion and at least two light output portions. The respective cameras 21 correspond to different light output portions. The image acquisition device 20 acquires light modulated by the target object through the beam processing device 22.

The image acquisition device 20 further includes a second imaging lens 23. The second imaging lens 23 corresponds to the light input portion of the beam processing device 22. Light acquired by the image acquisition device 20 is emitted towards the light input portion of the beam processing device 22 to different light output portions of the beam processing device 22 through the second imaging lens 23.

That is, the image acquisition device 20 enables the plurality of cameras 21 to respectively perform imaging based on coaxial light incident from the same second imaging lens 23 by means of the arranged beam processing device 22, i.e. enables stripe patterns respectively obtained by the plurality of cameras 21 to have consistent fields of view and angles. Specifically, the light input portion of the beam processing device 22 is provided with a second imaging lens 23. The beam processing device 22 includes a plurality of light output portions corresponding to the cameras 21 one by one. The beam processing device 22 performs direction adjustment and/or band separation on light incident therein, so that the respective cameras 21 may respectively perform imaging based on light in the same incident direction and may perform imaging based on light of a specified band.

For example, as shown in FIG. 4, light of the target object enters the light input portion of the beam processing device 22. The beam processing device 22 separates image light of the target object so that the image light is emitted out from the at least two light output portions respectively to be projected onto the plurality of cameras 21. At this moment, stripe images acquired by the plurality of cameras 21 are all stripe images obtained in the same perspective.

Optionally, the beam processing device 22 further includes at least one first beam separation unit configured to separate light projected from the light input portion so that the light is projected from the at least two light output portions to the cameras 21 corresponding to the light output portions respectively.

That is, the beam processing device 22 separates the received light into light projected in a plurality of directions by the first beam separation unit. For example, a beam of red and blue light is processed by the first beam separation unit to form two beams of red and blue light, which are emitted out in different directions respectively.

Optionally, the beam processing device 22 further includes at least one second beam separation unit configured to separate light to be obtained by a specified camera 21 so that the specified camera 21 obtains light of a specified band. The specified band at least includes: a light band contained in at least one beam of initial light.

That is, the beam processing device 22 may separate light of a partial band from the received light by the second beam separation unit. For example, a beam of red and blue light is processed by the second beam separation unit to form a beam of blue light.

It should be noted that the first beam separation unit and the second beam separation unit in the present application may be integrated in one physical unit, or each unit may be physically present separately.

For examples, the first beam separation unit may be a partial-reflection partial-transmission prism 22c. The second beam separation unit may be a light filter 22d. The first beam separation unit and the second beam separation unit may be integrated in a right-angled two-channel dichroic prism 22a. The first beam separation unit and the second beam separation unit may be integrated in a three-channel dichroic prism 22b.

For example, a pre-designed predetermined stripe image A is projected onto a target object by the image projection device 10 at a time period a of a predetermined period. The predetermined stripe image A is formed by combining a blue stripe and a green stripe. In the case where the camera 21 in the image acquisition device 20 acquires light modulated by the target object, the second beam separation unit corresponding to the camera 21 separates the light to be obtained by the camera 21, so that the camera 21 can obtain green light and blue light. Preferably, only the green light and the blue light can be obtained by the camera 21.

Preferably, the plurality of cameras 21 included in the image acquisition device 20 correspond to a plurality of predetermined stripe patterns one by one. That is, each camera 21 may identify and determine that a light color is consistent with a stripe color included in the corresponding predetermined stripe pattern.

Optionally, the number of stripe colors in the reconstruction image is less than the number of stripe colors in the predetermined color-coded stripe, so that the spacing between adjacent stripes is not too small, and the problem that the spacing is too small to match accurately in the stripe matching process is solved. Preferably, the reconstruction image is composed of only one color stripe. Preferably, the reconstruction image is obtained by a monochrome camera 21. Preferably, the reconstruction image is a monochrome stripe image generated only by blue light, and the blue light has higher anti-interference and higher stability than light of other colors.

It should be noted that the three-dimensional scanner may further include: a heat dissipation system, a heating anti-fog system, a software algorithm system, etc. The heat dissipation system is configured to prevent damage to the scanner caused by overheating inside the three-dimensional scanning device. The heating anti-fog system is configured to prevent failure to obtain accurate stripe images caused by the fogging phenomenon of each optical instrument in the three-dimensional scanner. The software algorithm system is configured to perform three-dimensional reconstruction on the target object according to at least one stripe image obtained by the image acquisition device 20.

In summary, according to the three-dimensional scanner provided by the embodiments of the present application, the stripe extraction algorithm based on spatial coding achieves the technical effects of eliminating the projection requirements of dynamic projection and realizing three-dimensional reconstruction of a target object only with a few two-dimensional images, and solves the technical problem that three-dimensional reconstruction methods in the related art are high in hardware cost and are thus not conducive to the promotion and use of a three-dimensional scanning device.

In addition, the three-dimensional scanner also improves the accuracy of three-dimensional identification by using colors as spatial coding information.

In order to enable those skilled in the art to understand the technical solutions of the present application more clearly, the following will be described with reference to specific embodiments.

Embodiment I

Taking FIG. 9 as an example, the beam processing device 22 includes a right-angled two-channel dichroic prism 22a, and the right-angled two-channel dichroic prism 22a includes a third light output portion and a fourth light output portion. The beam processing device 22 separates light projected from the light input portion through the right-angled two-channel dichroic prism 22a so that the light is respectively projected from the third light output portion and the fourth light output portion to cameras 21 corresponding to the respective light output portions.

Correspondingly, the image acquisition device 20 includes a third camera 213 corresponding to the third light output portion, and a fourth camera 214 corresponding to the fourth light output portion. The third camera 213 generates a third stripe image based on the acquired light. The fourth camera 214 generates a fourth stripe image based on the acquired light. The third stripe image and the fourth stripe image both include identifiable stripes of at least two colors.

It should be noted that the inclusion of stripes of at least two colors in both the third stripe image and the fourth stripe image is used for realizing a distinguishing process of two stripes in color, not a limitation of the color.

In addition, the beam processing device 22 separates light to be obtained by a specified camera 21 through the right-angled two-channel dichroic prism 22a so that the specified camera 21 obtains light containing a specified band. The operation of obtaining light containing a specified band by the specified camera 21 includes: obtaining light of a third specified band by the third camera 213, and obtaining light of a fourth specified band by the fourth camera 214.

Hereinafter, an example is provided for description.

Preferably, the third camera 213 is a monochrome camera 21, and the fourth camera 214 is a color camera 21.

The light emitting portion 12 emits red light to the light transmitting portion 13 at a first time period. After the red light is projected by a predetermined pattern on the light transmitting portion 13, a first predetermined stripe pattern is generated. The first predetermined stripe pattern is projected onto the target object in the form of red coded stripes. Light is transferred to the image processing device after being modulated by the target object. In the present embodiment, the right-angled two-channel dichroic prism 22a is a red/green/blue dichroic prism, so that red light is emitted from the third light output portion and green light and blue light are emitted from the fourth light output portion. At this moment, the red coded stripes are emitted from the third light output portion through the right-angled two-channel dichroic prism 22a and acquired by the monochrome camera 21. The monochrome camera 21 generates a third stripe image containing red stripes.

The light emitting portion 12 emits green light and blue light to the light transmitting portion 13 at a second time period. After the green light and the blue light are transmitted by a predetermined pattern on the light transmitting portion 13, a second predetermined stripe pattern is generated. The second predetermined stripe pattern is projected onto the target object in the form of green/blue coded stripes. Light is transferred to the image processing device after being modulated by the target object. At this moment, the green/blue coded stripes are emitted from the fourth light output portion through the right-angled two-channel dichroic prism 22a and acquired by the color camera 21. The color camera 21 generates a fourth stripe image containing green stripes and blue stripes.

The illumination member 30 projects illumination light onto the target object at an eighth time period. The illumination light is transferred to the image processing device after being emitted by the target object. Blue light and green light in the illumination light are acquired by the color camera 21 to generate a fourth texture image. Red light is acquired by the monochrome camera 21 to generate a third texture image. The third texture image and the fourth texture image are synthesized into a texture image of the target object. It can be seen that in order to obtain the texture image of the target object, red light, green light and blue light all need to be acquired and identified by the color camera 21, or red light, green light and blue light all need to be acquired and identified by the color camera 21 and the monochrome camera 21, i.e. part of the color light is acquired and identified by the color camera 21, and part of the color light is acquired and identified by the monochrome camera 21.

Further, since the third stripe image and the fourth stripe image both correspond to the same light transmitting portion 13, the respective stripes in the third stripe image and the fourth stripe image correspond to each other. Specifically, after the third stripe image and the fourth stripe image are combined based on the same coordinate system, the stripes therein correspond to the predetermined color-coded stripes on the light transmitting portion 13.

Specifically, the third stripe image is taken as a reconstruction image, and the fourth stripe image is taken as a coding image. The fourth stripe image is acquired by the color camera 21, and green stripes and blue stripes in the fourth stripe image may both be identified and determined, thereby determining coding sequences of the respective stripes in the fourth stripe image. The respective stripes of the third stripe image may be identified and matched by coding sequences of fourth stripes to realize three-dimensional reconstruction based on a stripe correspondence between the third stripe image and the fourth stripe image.

Preferably, the monochrome camera 21 obtains only single-color light. Therefore, the third stripe image may also be identified and determined. The third stripe image may be combined with the fourth stripe image to determine coding sequences of the respective stripes. That is, the third stripe image and the fourth stripe image are both taken as coding images.

In addition, the light filter 22d may be arranged or the light filter 22d may not be arranged in the present embodiment. The light filter 22d may be arranged in cooperation with the right-angled two-channel dichroic prism 22a.

It is worth emphasizing that in this embodiment, the beam processing device 22 separates light projected from the light input portion through the right-angled two-channel dichroic prism 22a so that the light is respectively projected from the third light output portion and the fourth light output portion to cameras 21 corresponding to the respective light output portions. That is, the beam processing device 22 realizes the function corresponding to the first beam separation unit through the right-angled two-channel dichroic prism 22a.

Similarly, it is also worth emphasizing that in this embodiment, the beam processing device 22 also separates light to be obtained by a specified camera 21 through the right-angled two-channel dichroic prism 22a so that the specified camera 21 obtains light containing a specified band. That is, the beam processing device 22 realizes the function corresponding to the second beam separation unit through the right-angled two-channel dichroic prism 22a.

The right-angled two-channel dichroic prism 22a integrates a first beam separation unit and a second beam separation unit so as to enable light of a specified band to be emitted from a specified direction. For example, the right-angled two-channel dichroic prism 22a enables red and green light to be emitted from the third light output portion and blue light to be emitted from the fourth light output portion. When a beam containing red, green and blue light passes through the right-angled two-channel dichroic prism 22a, the red and green light is separated from the blue light, the red and green light is emitted through the third light output portion, and the blue light is emitted through the third light output portion.

Embodiment II

Figure 11:
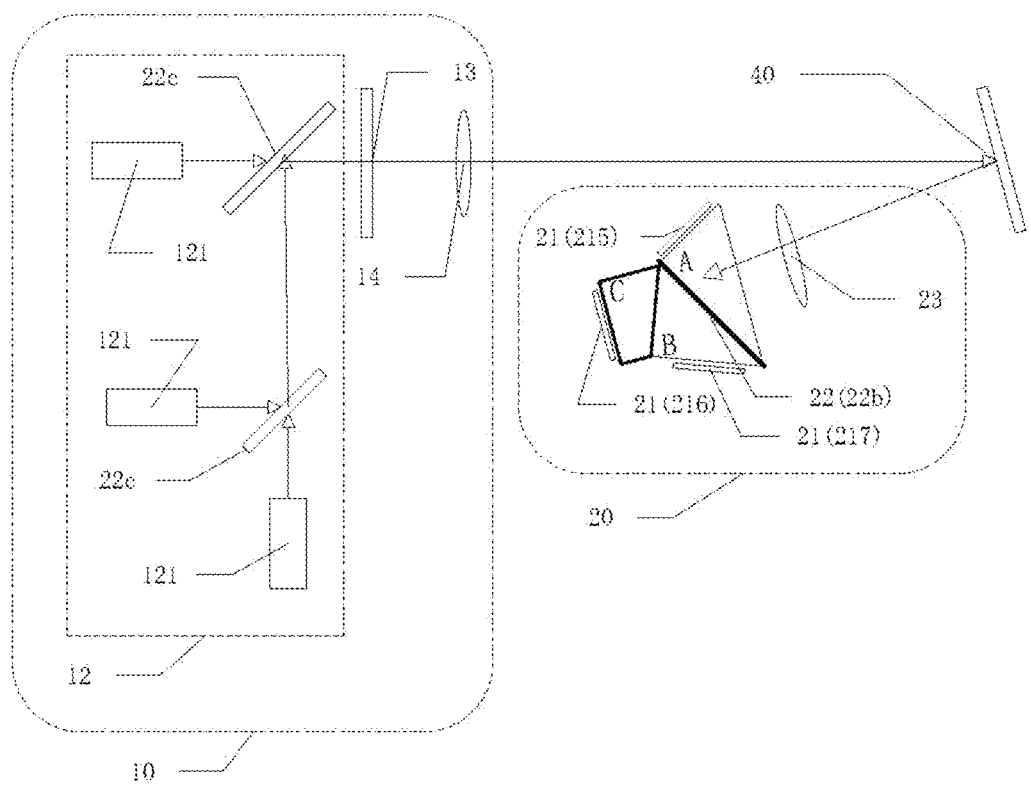
FIG. 11 is a schematic diagram VI of an optional three-dimensional scanner according to an embodiment of the present application.

Taking FIG. 11 as an example, the beam processing device 22 includes a three-channel dichroic prism 22b, and the three-channel dichroic prism 22b includes a fifth light output portion, a sixth light output portion, and a seventh light output portion. The beam processing device 22 separates light projected from the light input portion through the three-channel dichroic prism 22b so that the light is respectively projected from the fifth light output portion, the sixth light output portion, and the seventh light output portion to cameras 21 corresponding to the respective light output portions.

Correspondingly, the image acquisition device 20 includes a fifth camera 215 corresponding to the fifth light output portion, a sixth camera 216 corresponding to the sixth light output portion, and a seventh camera 217 corresponding to the seventh light output portion. The fifth camera 215 generates a fifth stripe image based on the acquired light. The sixth camera 216 generates a sixth stripe image based on the acquired light. The seventh camera 217 generates a seventh stripe image based on the acquired light. The fifth stripe image, the sixth stripe image, and the seventh stripe image all include identifiable stripes of at least two colors.

It should be noted that the inclusion of stripes of at least two colors in the fifth stripe image, the sixth stripe image and the seventh stripe image is used for realizing a distinguishing process of two stripes in color, not a limitation of the color.

At this moment, the beam processing device 22 separates light to be obtained by a specified camera 21 through the three-channel dichroic prism 22b so that the specified camera 21 obtains light containing a specified band. The operation of obtaining light containing a specified band by the specified camera 21 at least includes: obtaining light of a fifth specified band by the fifth camera 215, and obtaining light of a sixth specified band by the sixth camera 216, the fifth specified band being different from the sixth specified band.

Preferably, at least one of the fifth camera 215, the sixth camera 216 and the seventh camera 217 is a monochrome camera 21. Specifically, the fifth camera 215 is a monochrome camera 21 and the sixth camera 216 and the seventh camera 217 are color cameras 21. Alternatively, the fifth camera 215 and the sixth camera 216 are monochrome cameras 21 and the seventh camera 217 is a color camera 21. Alternatively, the fifth camera 215, the sixth camera 216 and the seventh camera 217 are all monochrome cameras 21.

Hereinafter, an example is provided for description.

Preferably, the fifth camera 215, the sixth camera 216 and the seventh camera 217 are all monochrome cameras 21.

The light emitting portion 12 emits red light to the light transmitting portion 13 at a third time period. After the red light is projected by predetermined color-coded stripes on the light transmitting portion 13, a third predetermined stripe pattern is generated. The third predetermined stripe pattern is projected onto the target object in the form of red coded stripes. Light is transferred to the image processing device after being modulated by the target object. In the present embodiment, the beam processing device is the three-channel dichroic prism 22b configured to separate red, green and blue colors, so that red light is emitted from the fifth light output portion, green light is emitted from the sixth light output portion, and blue light is emitted from the seventh light output portion. At this moment, the red coded stripes are decomposed by the three-channel dichroic prism 22b and acquired by the fifth camera 215 through the fifth light output portion. The fifth camera 215 generates a fifth stripe image containing red stripes.

The light emitting portion 12 emits blue light to the light transmitting portion 13 at a fourth time period. After the blue light is projected by a predetermined pattern on the light transmitting portion 13, a fourth predetermined stripe pattern is generated. The fourth predetermined stripe pattern is projected onto the target object in the form of blue coded stripes. Light is transferred to the image processing device after being modulated by the target object. At this moment, the blue coded stripes are decomposed by the three-channel dichroic prism 22b and acquired by the sixth camera 216 through the sixth light output portion. The sixth camera 216 generates a sixth stripe image containing blue stripes.

The light emitting portion 12 emits green light to the light transmitting portion 13 at a fifth time period. After the green light is projected by a predetermined pattern on the light transmitting portion 13, a fifth predetermined stripe pattern is generated. The fifth predetermined stripe pattern is projected onto the target object in the form of green coded stripes. Light is transferred to the image processing device after being modulated by the target object. At this moment, the green coded stripes are decomposed by the three-channel dichroic prism 22b and acquired by the seventh camera 217 through the seventh light output portion. The seventh camera 217 generates a seventh stripe image containing green stripes.

The illumination member 30 projects illumination light onto the target object at a ninth time period. The illumination light is transferred to the image processing device after being emitted by the target object. Red light in the illumination light is acquired by the fifth camera 215 to generate a fifth texture image. Blue light is acquired by the sixth camera 216 to generate a sixth texture image. Green light is acquired by the seventh camera 217 to generate a seventh texture image. The fifth texture image, the sixth texture image and the seventh texture image are synthesized into a texture image of the target object. It can be seen that in order to obtain the texture image of the target object, red light, green light and blue light all need to be acquired and identified by the color camera 21, or red light, green light and blue light all need to be acquired and identified by the color camera 21 and the monochrome camera 21, i.e. part of the color light is acquired and identified by the color camera 21, and part of the color light is acquired and identified by the monochrome camera 21, or red light, green light and blue light all need to be acquired and identified by the monochrome camera 21, i.e. light of each color is independently acquired by a monochrome camera 21 respectively so as to be identified and determined.

Further, since the fifth stripe image, the sixth stripe image and the seventh stripe image all correspond to the same light transmitting portion 13, the respective stripes in the fifth stripe image, the sixth stripe image and the seventh stripe image correspond to each other. Specifically, after being combined, the fifth stripe image, the sixth stripe image and the seventh stripe image correspond to the predetermined patterns on the light transmitting portion 13.

Specifically, any stripe image combination determined by the fifth stripe image, the sixth stripe image and the seventh stripe image may be taken as a reconstruction image, and any stripe image combination determined by the fifth stripe image, the sixth stripe image and the seventh stripe image may be taken as a coding image. Preferably, the fifth stripe image, the sixth stripe image and the seventh stripe image are taken as a coding image together to determine coding sequences of the respective stripes. The fifth stripe image, the sixth stripe image and the seventh stripe image are taken as a reconstruction image together to realize three-dimensional reconstruction.

In addition, the light filter 22d may be arranged or the light filter 22d may not be arranged in the present embodiment. The light filter 22d may be arranged in cooperation with the three-channel dichroic prism 22b.

It is worth emphasizing that in this embodiment, the beam processing device 22 separates light projected from the light input portion through the three-channel dichroic prism 22b so that the light is respectively projected from the fifth light output portion, the sixth light output portion and the seventh light output portion to cameras 21 corresponding to the respective light output portions. That is, the beam processing device 22 realizes the function corresponding to the first beam separation unit through the three-channel dichroic prism 22b.

Similarly, in this embodiment, the beam processing device 22 also separates light to be obtained by a specified camera 21 through the three-channel dichroic prism 22b so that the specified camera 21 obtains light containing a specified band. That is, the beam processing device 22 realizes the function corresponding to the second beam separation unit through the three-channel dichroic prism 22b.

Embodiment III

Figure 12:
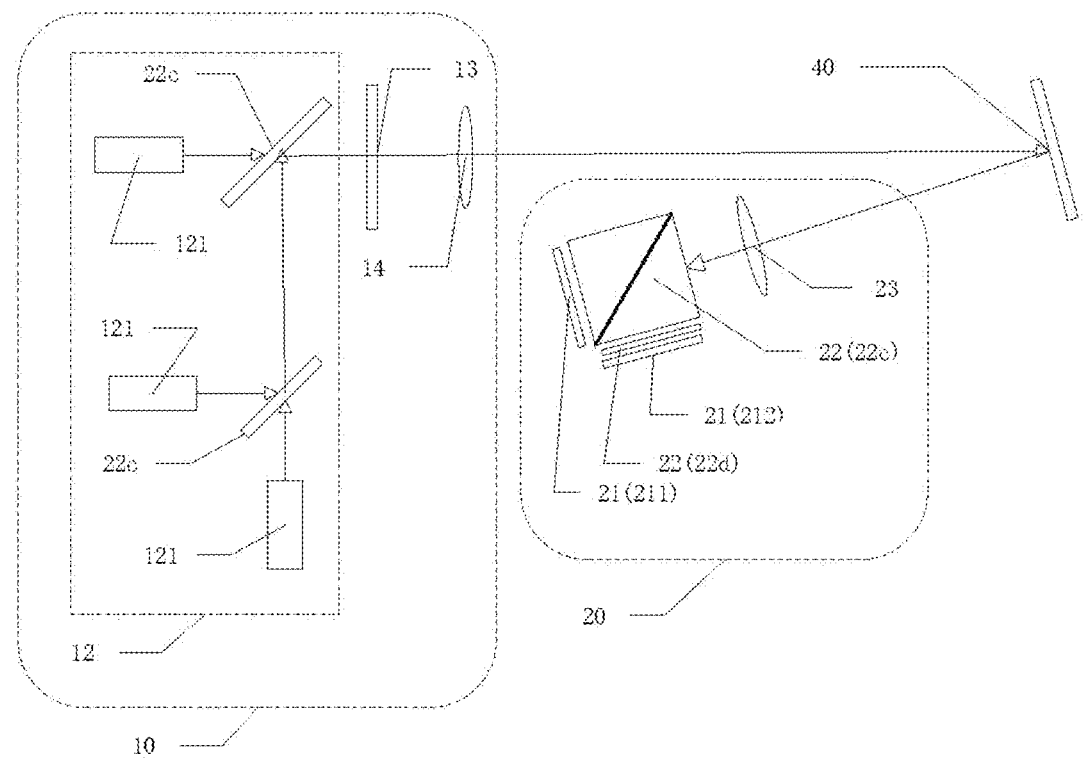
FIG. 12 is a schematic diagram VII of an optional three-dimensional scanner according to an embodiment of the present application.

Taking FIG. 12 as an example, the beam processing device 22 includes a partial-reflection partial-transmission prism 22c, and the partial-reflection partial-transmission prism 22c includes a first light output portion and a second light output portion. The beam processing device 22 separates light projected from the light input portion through the partial-reflection partial-transmission prism 22c so that the light is respectively projected from the first light output portion and the second light output portion to cameras 21 corresponding to the respective light output portions.

Correspondingly, the image acquisition device 20 includes a first camera 211 corresponding to the first light output portion, and a second camera 212 corresponding to the second light output portion. The first camera 211 generates a first stripe image based on the acquired light. The second camera 212 generates a second stripe image based on the acquired light. The first stripe image and the second stripe image both include identifiable stripes of at least two colors.

It should be noted that the inclusion of stripes of at least two colors in both the first stripe image and the second stripe image is used for realizing a distinguishing process of two stripes in color, not a limitation of the color.

In addition, in an embodiment, the beam processing device 22 further includes a light filter 22d. The beam processing device 22 separates light acquired by a specified camera 21 through the light filter 22d so that the specified camera 21 obtains light containing a specified band, and at least one camera 21 in the plurality of cameras 21 is a specified camera 21.

In an optional example, the light filter 22d is arranged between the first light output portion and the first camera 211 so that the first camera 211 obtains light of a first specified band, and/or, arranged between the second light output portion and the second camera 212 so that the second camera 212 obtains light of a second specified band.

Hereinafter, an example is provided for description.

Preferably, the first camera 211 is a monochrome camera 21, the second camera 212 is a color camera 21, and the monochrome camera 21 corresponds to the light filter 22d.

The light emitting portion 12 emits red light to the light transmitting portion 13 at a sixth time period. After the red light is projected by a predetermined pattern (i.e. predetermined coded stripes) on the light transmitting portion 13, a sixth predetermined stripe pattern is generated. The sixth predetermined stripe pattern is projected onto the target object in the form of red coded stripes. Light is transferred to the image processing device after being modulated by the target object. At this moment, the red coded stripes are decomposed by the partial-reflection partial-transmission prism 22c into two beams of red light. At least one beam of light is acquired by the monochrome camera 21 to generate a first stripe image.

In addition, the light is filtered by a red light filter 22d before being acquired by the monochrome camera 21. That is, a filter color of the light filter 22d arranged in front of the camera 21 corresponds to the color of a beam acquired by the camera 21.

The light emitting portion 12 emits red light and blue light to the light transmitting portion 13 at a seventh time period. After the red light and the blue light are projected by a predetermined image on the light transmitting portion 13, a seventh predetermined stripe pattern is generated. The seventh predetermined stripe pattern is projected onto the target object in the form of red/blue coded stripes. Light is transferred to the image processing device after being modulated by the target object. At this moment, the red/blue coded stripes are decomposed by the partial-reflection partial-transmission prism 22c into two beams of red and blue light. At least one beam of light is acquired by the color camera 21 to generate a second stripe image.

The illumination member 30 projects illumination light onto the target object at a tenth time period. The illumination light is transferred to the image processing device after being emitted by the target object. Red light, blue light and green light in the illumination light are acquired by the second camera 212 to generate a texture image. It the present embodiment, if the light filter 22d is arranged in front of the color camera 21, in order to obtain the texture image of the target object, red light, green light and blue light need to be acquired and identified by the color camera 21 and the monochrome camera 21, i.e. part of the color light is acquired and identified by the color camera 21, and part of the color light is acquired and identified by the monochrome camera 21.

Further, since the first stripe image and the second stripe image both correspond to the same light transmitting portion 13, the respective stripes in the first stripe image and the second stripe image correspond to each other. Specifically, after being combined, the first stripe image and the second stripe image correspond to the predetermined patterns on the light transmitting portion 13.

Specifically, the first stripe image is taken as a reconstruction image, and the second stripe image is taken as a coding image. The second stripe image is acquired by the color camera 21, and red stripes and blue stripes in the second stripe image may both be identified and determined, thereby determining coding sequences of the respective stripes in the second stripe image. The respective stripes of the first stripe image may be identified and matched by coding sequences of the second stripe image to realize three-dimensional reconstruction based on a stripe correspondence between the first stripe image and the second stripe image.

It should be noted that the arrangement of the light filter 22d in front of the monochrome camera 21 is an optional example. The present application does not specifically define whether to arrange the light filter 22d in front of the camera 21, and only ensures that stripes of at least two colors in a stripe image obtained by each camera 21 may be identified and determined.

Specifically, the light filter 22d is not arranged in front of the monochrome camera 21, and the first stripe image obtained by the monochrome camera 21 contains red stripes. Alternatively, a blue light filter 22d is arranged in front of the color camera 21, and the second stripe image obtained by the color camera 21 contains blue stripes. Since the light emitting portion 12 emits red light at the sixth time period and emits red light and blue light at the seventh time period, in order to ensure that stripes of at least two colors in the stripe image obtained by each camera 21 may be identified and determined, a red light filter 22d cannot be arranged in front of the color camera 21, so as to avoid only red stripes being in the stripe image obtained by the monochrome camera 21 and the color camera 21. Alternatively, a two-color light filter 22d is arranged in front of the color camera 21, and the second stripe image obtained by the color camera 21 contains red stripes and blue stripes.

It should be noted that each predetermined stripe pattern in each period and a projection time interval of the illumination light are very small, thus ensuring that the three-dimensional scanner remains stationary or substantially stationary in this period, and the predetermined stripe pattern and the illumination light are (substantially) projected onto the same region of the target object.

It is worth emphasizing that in this embodiment, the beam processing device 22 separates light projected from the light input portion by transmitting and reflecting the light through the partial-reflection partial-transmission prism 22c so that the light is respectively projected from the first light output portion and the second light output portion to cameras 21 corresponding to the respective light output portions. That is, the beam processing device 22 realizes the function corresponding to the first beam separation unit through the partial-reflection partial-transmission prism 22c.

Meanwhile, it is also worth emphasizing that in this embodiment, the beam processing device 22 separates light to be obtained by a specified camera 21 through the light filter 22d so that the specified camera 21 obtains light containing a specified band. That is, the beam processing device 22 realizes the function corresponding to the second beam separation unit through the light filter 22d.

It should be noted that the above Embodiments I, II and III listed in the present application are all illustrative examples to enable a person skilled in the art to more clearly understand the technical solution of the present application. The present application is not specifically limited herein. If other specific devices may realize the functional definition description of the beam processing device 22 in the present application, the devices may also serve as an executable technical solution of the present application.

In addition, it should also be noted that the above Embodiments I, II and III listed in the present application may all be combined with reference to each other to realize the functional definition description of the beam processing device 22 in the present application. For example, in Embodiments II and III, after the beam processing device 22 realizes the function corresponding to the second beam separation unit through the right-angled two-channel dichroic prism 22a or the three-channel dichroic prism 22b, the beam processing device 22 may still continue to realize the function corresponding to the second beam separation unit again through the light filter 22d.

In summary, by comparing the present scheme with the prior art, the beneficial effects of the present invention are as follows:

1. A stripe extraction algorithm based on spatial coding achieves the technical object of three-dimensional reconstruction of a target object with only a few two-dimensional images, and achieves the technical effect of reducing the frame rate of cameras 21 and the operation cost of the algorithm.

2. By using colors as spatial coding information, the coding information is easily identified, and then the technical effect of improving the identification accuracy is achieved.

3. Based on the technical principle of the three-dimensional scanner of the present application, the three-dimensional scanner may perform pattern projection processing by means of simple transmission projection. Further, in the case where the three-dimensional scanner performs pattern projection processing by means of transmission projection, the hardware cost is greatly reduced.

4. In the case where the three-dimensional scanner performs pattern projection processing using a laser as a light source, the brightness and depth of field of the projection device (i.e. a combination of the light emitting portion 12 and the light transmitting portion 13) can be increased, and the technical effects of low cost, high brightness and high depth of field can be achieved.

That is, the three-dimensional scanner provided by the present application has the advantages of low hardware cost, low real-time frame rate requirements, high brightness and large depth of field of an optical system, and device miniaturization. Further, the three-dimensional scanner can directly perform dynamic real-time three-dimensional scanning with color texture on materials characterized by light reflection, transmission and diffusion such as intra-oral teeth and gums.

According to embodiments of the present application, a three-dimensional scanning system is also provided.

Figure 13:
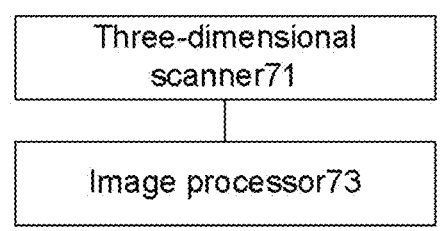
FIG. 13 is a schematic diagram of an optional three-dimensional scanning system according to an embodiment of the present application.

FIG. 13 is a schematic diagram of a three-dimensional scanning system according to an embodiment of the present application. As shown in FIG. 13, the three-dimensional scanning system includes: a three-dimensional scanner 71 and an image processor 73.

The three-dimensional scanner 71 is configured to respectively project, in each predetermined period, a predetermined stripe pattern corresponding to the predetermined period to a target object, and acquire light modulated by the target object so as to obtain a plurality of stripe images in the case where predetermined stripe patterns are projected onto the target object. Stripes of each predetermined stripe pattern are disposed according to arrangement of predetermined color-coded stripes. Each predetermined stripe pattern includes stripes of at least one color in the predetermined color-coded stripes, and a plurality of predetermined stripe patterns include stripes of at least two colors in the predetermined color-coded stripes. The stripes in the predetermined stripe patterns are arranged in the same way as stripes of the same color in the predetermined color-coded stripes.

The image processor 73 is connected to the three-dimensional scanner 71, and configured to obtain a plurality of stripe images obtained by the three-dimensional scanner 71, and take the stripe images as coding images to determine respective stripe sequences and as reconstruction images to perform three-dimensional reconstruction on the target object.

It should be noted that the three-dimensional scanner 71 is any one three-dimensional scanner provided by the above embodiments.

It should also be noted that according to the three-dimensional scanning system, a stripe extraction algorithm based on spatial coding achieves the technical effects that the three-dimensional scanner 71 may perform pattern projection processing by means of simple transmission projection and realizing three-dimensional reconstruction of a target object only with a few two-dimensional images, and solves the technical problem that three-dimensional reconstruction methods in the related art are high in hardware cost and are thus not conducive to the promotion and use of a three-dimensional scanning device.

In addition, the three-dimensional scanning system also improves the accuracy of three-dimensional identification by using colors as spatial coding information.

In an optional example, in the case where the three-dimensional scanner 71 acquires light modulated by the target object through a plurality of cameras 21 so as to obtain a plurality of stripe images and the plurality of cameras 21 include at least one monochrome camera 21, the image processor 73 is further configured to: take a stripe image obtained by the at least one monochrome camera 21 as a reconstruction image to perform three-dimensional reconstruction on the target object; and take stripe images obtained by at least a plurality of monochrome cameras 21 as coding images to determine respective stripe sequences, and/or, take a stripe image obtained by at least one color camera 21 as a coding image to determine respective stripe sequences.

According to embodiments of the present application, a three-dimensional scanning method is also provided.

It should be noted that the three-dimensional scanning method in the embodiments of the present application is applied to the above three-dimensional scanner provided in the embodiments of the present application. The three-dimensional scanning method provided by the embodiments of the present application will be described below.

Figure 14:
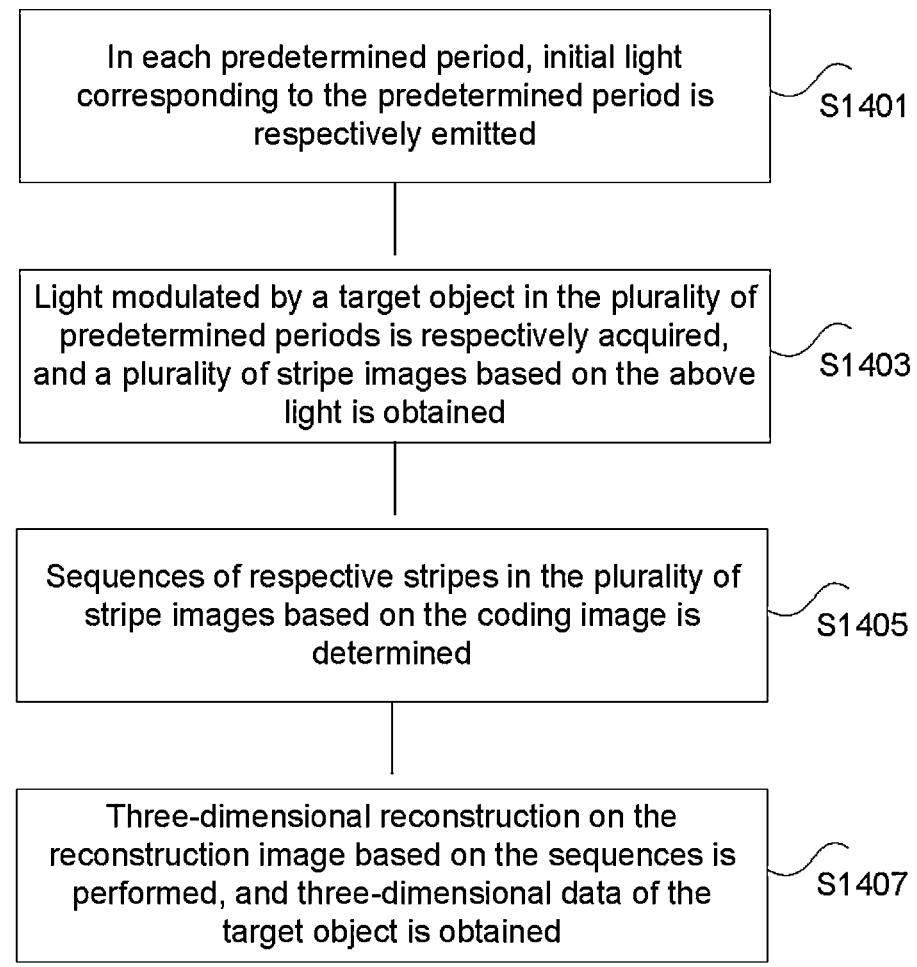
FIG. 14 is a flowchart III of an optional three-dimensional scanning method according to an embodiment of the present application.

FIG. 14 is a flowchart of a three-dimensional scanning method according to an embodiment of the present application. As shown in FIG. 14, the three-dimensional scanning method includes the following steps.

In step S1401, in each predetermined period, initial light corresponding to the predetermined period is respectively emitted. Each beam of the initial light is composed of light of at least one color in the predetermined color-coded stripes, and after each beam of the initial light is transmitted by patterns of the predetermined color-coded stripes on the light transmitting portion 13, respective corresponding predetermined color stripes are generated and projected onto a target object.

In step S1403, light modulated by the target object in the plurality of predetermined periods is respectively acquired, and a plurality of stripe images are obtained based on the above light. The obtained stripe images are taken as coding images to determine respective stripe sequences and as reconstruction images to perform three-dimensional reconstruction on the target object.

In step S1405, sequences of respective stripes in the plurality of stripe images are determined based on the coding image.

In step S1407, three-dimensional reconstruction is performed on the reconstruction image based on the sequences, and three-dimensional data of the target object is obtained.

In summary, according to the three-dimensional scanning method provided by the embodiments of the present application, a stripe extraction algorithm based on spatial coding achieves the technical effects that the three-dimensional scanner may perform pattern projection processing by means of simple transmission projection and realizing three-dimensional reconstruction of a target object only with a few two-dimensional images, and solves the technical problem that three-dimensional reconstruction methods in the related art are high in hardware cost and are thus not conducive to the promotion and use of a three-dimensional scanning device.

In addition, the three-dimensional scanning method also achieves the technical effect of improving the accuracy of three-dimensional identification by using colors as spatial coding information.

In an optional example, the three-dimensional scanning method further includes: projecting illumination light onto the target object and obtaining texture data of the target object based on the illumination light; and obtaining color three-dimensional data of the target object based on the three-dimensional data and the texture data of the target object.

Optionally, the texture data may be obtained by a single camera 21, or synthesized from data obtained by a plurality of cameras 21.

Preferably, in step S803, light modulated by the target object is acquired, and at least two stripe images are obtained based on the light. At least one of the stripe images is obtained by a monochrome camera 21. The stripe image obtained by the monochrome camera 21 is taken as a reconstruction image.

Specifically, in step S805, sequences of respective stripes in a plurality of stripe images are determined based on the coding image, and a coding sequence is determined based on arrangement information and color information of the respective stripes in the coding image. For example, if four stripes arranged in red, green, green, and red are coded and decoded by red (1, 0) and green (0, 1), the coding sequence thereof is (1, 0) (0, 1) (0, 1) (1, 0). For another example, five stripes arranged in red, blue, blue, green, and red are coded and decoded by red (1, 0, 0), green (0, 1, 0) and blue (0, 0, 1), the coding sequence thereof is (1, 0, 0), (0, 0, 1), (0, 0, 1), (0, 1, 0), (1, 0, 0).

Specifically, in step S807, the respective stripes of the reconstruction image are matched based on the coding sequences. For binocular reconstruction, in combination with the present embodiment in which there are two image acquisition devices 20, stripe matching is performed on reconstruction images of the two image acquisition devices 20, and point cloud reconstruction is performed after matching, so as to obtain three-dimensional data of a target object. For monocular reconstruction, in combination with the present embodiment in which there is one image acquisition device 20, stripe matching is performed on a reconstruction image of the image acquisition device 20 and predetermined color-coded stripes on the light transmitting portion 13, and point cloud reconstruction is performed after matching, so as to obtain three-dimensional data of a target object.

The following situations are illustrated with specific methods.

In an optional example, the light emitting portion 12 and the light transmitting portion 13 project red/blue color-coded stripes to a target object at a first time period. The red/blue color-coded stripes are modulated by the target object and then transferred to the image processing device. Light of the red/blue color-coded stripes is separated into at least one beam of light of red/blue color-coded stripes by the partial-reflection partial-transmission prism 22c. One of the beams of light of red/blue color-coded stripes is acquired by a color camera 21, and the color camera 21 generates a corresponding red/blue color-coded stripe image. And the light emitting portion 12 and the light transmitting portion 13 project blue coded stripes to the target object at a second time period. The blue coded stripes are modulated by the target object and then transferred to the image processing device. Light of the blue coded stripes is separated into at least one beam of light of blue coded stripes by the partial-reflection partial-transmission prism 22c. One of the beams of light of blue coded stripes is acquired by a monochrome camera 21 through a blue light filter 22d, and the monochrome camera 21 generates a corresponding blue stripe image.

In addition, the illumination member 30 illuminates white light to the target object at a third time period. The white light is reflected by the target object and then acquired by the color camera 21. The color camera 21 generates a texture image. A coding sequence of each stripe is determined based on the red/blue color-coded stripe image. The respective stripes of the blue stripe image are matched based on the coding sequence. Three-dimensional reconstruction is realized to obtain three-dimensional data of the target object. True-color three-dimensional data of the target object is obtained based on the three-dimensional data and the texture image.

In an optional example, the light emitting portion 12 and the light transmitting portion 13 project red/green color-coded stripes to a target object at a first time period. The red/green color-coded stripes are modulated by the target object and then transferred to the image processing device. Light of the red/green color-coded stripes is decomposed into one beam of light of red/green color-coded stripes by the right-angled two-channel dichroic prism 22a. The light of red/green color-coded stripes is acquired by a color camera 21, and the color camera 21 generates a corresponding red/green color-coded stripe image. And the light emitting portion 12 and the light transmitting portion 13 project blue coded stripes to the target object at a second time period. The blue coded stripes are modulated by the target object and then transferred to the image processing device. Light of the blue coded stripes is decomposed into one beam of light of blue coded stripes by the right-angled two-channel dichroic prism 22a. The beam of light of blue coded stripes is acquired by a monochrome camera 21, and the monochrome camera 21 generates a corresponding blue stripe image.

In addition, the illumination member 30 emits white light to the target object at a third time period. The white light is reflected by the target object and then acquired by the color camera 21 and the monochrome camera 21. The color camera 21 generates a texture image based on red light and green light. The monochrome camera 21 generates a texture image based on blue light. A coding sequence of each stripe is determined based on the red/green color-coded stripe image. The respective stripes of the blue stripe image are matched based on the coding sequence. Three-dimensional reconstruction is realized to obtain three-dimensional data of the target object. A texture image based on white light is synthesized based on the texture image of the color camera 21 and the texture image of the monochrome camera 21. True-color three-dimensional data of the target object is obtained based on the three-dimensional data and the texture image of the white light.

In an optional example, the light emitting portion 12 and the light transmitting portion 13 project red coded stripes to a target object at a first time period. The red coded stripes are modulated by the target object and then transferred to the image processing device. Light of the red coded stripes is decomposed into a beam of light of red coded stripes by the three-channel dichroic prism 22b. The beam of light of red coded stripes is acquired by a first monochrome camera 21, and the first monochrome camera 21 generates a corresponding red coded stripe image. The light emitting portion 12 and the light transmitting portion 13 project green coded stripes to the target object at a second time period. The green coded stripes are modulated by the target object and then transferred to the image processing device. Light of the green coded stripes is decomposed into a beam of light of green coded stripes by the three-channel dichroic prism 22b. The beam of light of green coded stripes is acquired by a second monochrome camera 21, and the second monochrome camera 21 generates a corresponding green coded stripe image. And the light emitting portion 12 and the light transmitting portion 13 project blue coded stripes to the target object at a third time period. The blue coded stripes are modulated by the target object and then transferred to the image processing device. Light of the blue coded stripes is decomposed into a beam of light of blue coded stripes by the three-channel dichroic prism 22b. The beam of light of blue coded stripes is acquired by a third monochrome camera 21, and the third monochrome camera 21 generates a corresponding blue coded stripe image.

In addition, the illumination member 30 emits white light to the target object at a fourth time period. The white light is reflected by the target object and then acquired by the three monochrome cameras 21. The first monochrome camera 21 generates a texture image based on red light, the second monochrome camera 21 generates a texture image based on green light, and the third monochrome camera 21 generates a texture image based on blue light. A coding sequence of each stripe is determined based on the combination of the red stripe image, the green stripe image and the blue stripe image. The respective stripes of the red stripe image, the green stripe image and the blue stripe image are matched based on the coding sequence. Three-dimensional reconstruction is realized to obtain three-dimensional data of the target object. A texture image based on white light is synthesized based on the texture images of the three monochrome cameras 21. True-color three-dimensional data of the target object is obtained based on the three-dimensional data and the texture image of the white light.

It should be noted that the steps shown in the flowcharts of the drawings may be performed in a computer system, such as a set of computer-executable instructions, and that, although a logical order is shown in the flowcharts, the steps shown or described may be performed in an order other than that described herein in some instances.

Embodiments of the present invention provide a storage medium having, stored thereon, a program which, when executed by a processor, implements the three-dimensional scanning method.

Embodiments of the present invention provide a processor for running a program. The program, when run, performs the three-dimensional scanning method.

It is also to be noted that the terms "include", "comprise" or any other variations thereof are intended to cover a non-exclusive inclusion, such that a process, method, article, or device including a series of elements not only includes those elements, but also includes other elements that are not explicitly listed, or also includes elements inherent to such a process, method, article, or device. It is not excluded, without more constraints, that additional identical elements exist in the process, method, article, or device including elements defined by a sentence "including a . . . ".

It should also be noted that the functional units in the various embodiments of the present invention may be integrated in one physical unit, each unit may be physically present separately, or two or more units may be integrated in one unit.

Those skilled in the art will appreciate that the embodiments of the present application may be provided as a method, a system, or a computer program product. Therefore, the present application may take the form of an entirely hardware embodiment, an entirely software embodiment, or an embodiment combining software and hardware. Moreover, the present application may take the form of a computer program product implemented on one or more computer available storage media (including, but not limited to, a disk memory, a CD-ROM, an optical memory, etc.) containing computer available program codes.

The above is merely the embodiments of the present application and is not intended to limit the present application. Various modifications and variations of the present application will occur to those skilled in the art. Any modifications, equivalent replacements, improvements, etc. that come within the spirit and principles of the present application are intended to be within the scope of the claims appended hereto.

And, in the above embodiments of the present invention, descriptions of the various embodiments are emphasized respectively, and parts which are not elaborated in detail in a certain embodiment may refer to relevant descriptions of other embodiments.

What is claimed is:

1. A three-dimensional scanner, comprising:
an image projection device (10), configured to project light onto a target object, wherein the light comprises predetermined light projected in a form of a color-coded stripe, the predetermined light is formed by coding stripes of at least two colors; and
an image acquisition device (20), configured to acquire light modulated by the target object so as to obtain at least one stripe image when light is projected onto the target object by the image projection device (10), wherein the obtained stripe image is taken as a coding image to determine respective stripe sequences and as a reconstruction image to perform three-dimensional reconstruction on the target object;
wherein the image acquisition device (20) further comprises a plurality of cameras (21), the plurality of cameras (21) comprising at least one monochrome camera, wherein the image acquisition device (20) acquires the light modulated by the target object through the plurality of cameras (21) to obtain a plurality of stripe images, a stripe image obtained by the at least one monochrome camera is taken as a reconstruction image to perform three-dimensional reconstruction on the target object; and stripe images obtained by at least a plurality of monochrome cameras are taken as coding images to determine respective stripe sequences, and/or, a stripe image obtained by at least one color camera is taken as a coding image to determine respective stripe sequences.

2. The three-dimensional scanner as claimed in claim 1, wherein the image acquisition device (20) further comprises a beam processing device (22), the beam processing device (22) comprising a light input portion and at least two light output portions, wherein the respective cameras (21) correspond to the different light output portions, respectively, and the image acquisition device (20) acquires the light modulated by the target object through the beam processing device (22).

3. The three-dimensional scanner as claimed in claim 2, wherein the beam processing device (22) further comprises at least one first beam separation unit configured to separate light projected from the light input portion so that the light is projected from the at least two light output portions to the cameras (21) corresponding to the light output portions respectively.

4. The three-dimensional scanner as claimed in claim 3, wherein the beam processing device (22) further comprises at least one second beam separation unit configured to separate light to be obtained by a specified camera so that the specified camera obtains light containing a specified band, wherein the color-coded stripe comprising a stripe of a color corresponding to the specified band.

5. The three-dimensional scanner as claimed in claim 4, wherein the specified camera is the monochrome camera.

6. The three-dimensional scanner as claimed in claim 4, wherein the three-dimensional scanner is arranged in any of the following manners:

the beam processing device (22) comprises a right-angled two-channel dichroic prism (22a), and the right-angled two-channel dichroic prism (22a) comprises a third light output portion and a fourth light output portion; the beam processing device (22) separates light projected from the light input portion through the right-angled two-channel dichroic prism (22a) so that the light is respectively projected from the third light output portion and the fourth light output portion to cameras (21) corresponding to the respective light output portions;

the image acquisition device (20) comprises a third camera (213) corresponding to the third light output portion, and a fourth camera (214) corresponding to the fourth light output portion, the third camera (213) generates a third stripe image based on the acquired light, the fourth camera (214) generates a fourth stripe image based on the acquired light, and the third stripe image and the fourth stripe image comprise identifiable stripes of at least two colors; and the beam processing device (22) separates light to be obtained by a specified camera through the right-angled two-channel dichroic prism (22a) so that the specified camera obtains light containing a specified band, wherein the operation of obtaining light containing a specified band by the specified camera comprises: obtaining light of a first filter band by the third camera (213), and/or obtaining light of a second filter band by the fourth camera (214);

the beam processing device (22) comprises a three-channel dichroic prism (22b), and the three-channel dichroic prism (22b) comprises a fifth light output portion, a sixth light output portion, and a seventh light output portion; the beam processing device (22) separates light projected from the light input portion through the three-channel dichroic prism (22b) so that the light is respectively projected from the fifth light output portion, the sixth light output portion, and the seventh light output portion to the cameras (21) corresponding to the respective light output portions;

the image acquisition device (20) comprises a fifth camera (215) corresponding to the fifth light output portion, a sixth camera (216) corresponding to the sixth light output portion, and a seventh camera (217) corresponding to the seventh light output portion, the fifth camera (215) generates a fifth stripe image based on the acquired light, the sixth camera (216) generates a sixth stripe image based on the acquired light, the seventh camera (217) generates a seventh stripe image based on the acquired light, and the fifth stripe image, the sixth stripe image, and the seventh stripe image comprise identifiable stripes of at least two colors;

the beam processing device (22) separates light obtained by a specified camera through the three-channel dichroic prism (22b) so that the specified camera obtains light containing a specified band, wherein the operation of obtaining light containing a specified band by the specified camera comprises: obtaining light of a third filter band by the fifth camera (215), and obtaining light of a fourth filter band by the sixth camera (216), the third filter band being different from the fourth filter band;

the beam processing device (22) comprises a half-reflecting and half-transmitting prism (22c), and the half-reflecting and half-transmitting prism (22c) comprises a first light output portion and a second light output portion; the beam processing device (22) separates light projected from the light input portion through the half-reflecting and half-transmitting prism (22c) so that the light is respectively projected from the first light output portion and the second light output portion to the cameras (21) corresponding to the respective light output portions;

the image acquisition device (20) comprises a first camera (211) corresponding to the first light output portion, and a second camera (212) corresponding to the second light output portion, the first camera (211) generates a first stripe image based on the acquired light, the second camera (212) generates a second stripe image based on the acquired light, and the first stripe image and the second stripe image comprise identifiable stripes of at least two colors.

7. A three-dimensional scanning system, comprising:
a three-dimensional scanner, configured to project light onto a target object and acquire light modulated by the target object so as to obtain at least one stripe image when light is projected onto the target object, wherein the projected light comprises predetermined light projected in a form of a color-coded stripe that is formed by coding stripes of at least two colors; and
an image processor, connected to the three-dimensional scanner, and configured to obtain at least one stripe image obtained by the three-dimensional scanner, and take the stripe image as a coding image to determine respective stripe sequences and as a reconstruction image to perform three-dimensional reconstruction on the target object,
wherein the three-dimensional scanner is the three-dimensional scanner as claimed in claim 1;
wherein the three-dimensional scanner comprises an image acquisition device (20), the image acquisition device (20) further comprises a plurality of cameras (21), the plurality of cameras (21) comprising at least one monochrome camera, wherein the image acquisition device (20) acquires the light modulated by the target object through the plurality of cameras (21) to obtain a plurality of stripe images, a stripe image obtained by the at least one monochrome camera is taken as a reconstruction image to perform three-dimensional reconstruction on the target object; and stripe images obtained by at least a plurality of monochrome cameras are taken as coding images to determine respective stripe sequences, and/or, a stripe image obtained by at least one color camera is taken as a coding image to determine respective stripe sequences.

8. The three-dimensional scanning system as claimed in claim 7, wherein when the three-dimensional scanner acquires light modulated by the target object through a plurality of cameras so as to obtain at least one stripe image and the plurality of cameras comprise at least one monochrome camera, the image processor is further configured to:
take a stripe image obtained by the at least one monochrome camera as a reconstruction image to perform three-dimensional reconstruction on the target object;
take stripe images obtained by at least a plurality of monochrome cameras as coding images to determine respective stripe sequences, and/or, take a stripe image obtained by at least one color camera as a coding image to determine respective stripe sequences.

9. A three-dimensional scanning method, applied to the three-dimensional scanner as claimed in claim 1, the three-dimensional scanning method comprising:
projecting predetermined light onto a target object in a form of a color-coded stripe;

acquiring light modulated by the target object, and obtaining at least one stripe image based on the light, wherein the obtained stripe image is taken as a coding image to determine respective stripe sequences and as a reconstruction image to perform three-dimensional reconstruction on the target object;

determining sequences of respective stripes in the plurality of stripe images based on the coding image; and performing three-dimensional reconstruction on the reconstruction image based on the sequences, and obtaining three-dimensional data of the target object;

wherein the three-dimensional scanning method further comprising:

projecting illumination light onto the target object and obtaining texture data of the target object based on the illumination light; and obtaining color three-dimensional data of the target object based on the three-dimensional data and the texture data of the target object.

10. A three-dimensional scanning method, applied to the three-dimensional scanner as claimed in claim 1, the three-dimensional scanning method comprising:

obtaining a first image and a second image, wherein the first image and the second image are stripe images obtained based on a same beam;

determining coding sequences of respective stripes based on the first image; and matching stripes of the second image based on the coding sequences to realize three-dimensional reconstruction so as to obtain three-dimensional data of a target object.

11. The three-dimensional scanning method as claimed in claim 10, further comprising:

obtaining texture data, and obtaining color three-dimensional data of the target object based on the three-dimensional data and the texture data.

12. A three-dimensional scanner, comprising:

an image projection device (10), configured to respectively project, in each predetermined period, a predetermined stripe pattern corresponding to the predetermined period onto a target object, wherein stripes of each predetermined stripe pattern are disposed according to arrangement of predetermined color-coded stripes, each predetermined stripe pattern comprises stripes of at least one color in the predetermined color-coded stripes, a plurality of predetermined stripe patterns comprise stripes of at least two colors in the predetermined color-coded stripes, and the stripes in the predetermined stripe patterns are arranged in the same way as stripes of the same color in the predetermined color-coded stripes; and an image acquisition device (20), configured to acquire light modulated by the target object so as to obtain a plurality of stripe images when predetermined stripe patterns are projected onto the target object, wherein the obtained stripe images are taken as coding images to determine respective stripe sequences and as reconstruction images to perform three-dimensional reconstruction on the target object;

wherein the image acquisition device (20) further comprises a plurality of cameras (21), the plurality of cameras (21) comprising at least one monochrome camera, wherein the image acquisition device (20) acquires the light modulated by the target object through the plurality of cameras (21) to obtain a plurality of stripe images, a stripe image obtained by the at least one monochrome camera is taken as a reconstruction image to perform three-dimensional reconstruction on the target object; and stripe images obtained by at least a plurality of monochrome cameras are taken as coding images to determine respective stripe sequences, and/or, a stripe image obtained by at least one color camera is taken as a coding image to determine respective stripe sequences.

13. The three-dimensional scanner as claimed in claim 12, wherein the image projection device (10) further comprises:

a DLP projection portion (11), wherein the image projection device (10) respectively projects, in each predetermined period, a predetermined stripe pattern corresponding to the predetermined period to the target object through the DLP projection portion (11).

14. The three-dimensional scanner as claimed in claim 12, wherein the image projection device (10) further comprises:

a light emitting portion (12), configured to respectively emit, in each predetermined period, initial light corresponding to the predetermined period, wherein each beam of the initial light is composed of light of at least one stripe color, and the stripe color is a color of stripes in the predetermined color-coded stripes; and a light transmitting portion (13), arranged on a transfer path of the initial light, wherein after each beam of the initial light is transmitted by patterns of predetermined color-coded stripes on the light transmitting portion (13), respective corresponding predetermined color stripes are generated and projected onto the target object.

15. The three-dimensional scanner as claimed in claim 14, wherein the light emitting portion (12) further comprises a plurality of light source units (121), bands of light emitted by all the light source units (121) being different; and the light emitting portion (12) emits the initial light through the plurality of light source units (121).

16. The three-dimensional scanner as claimed in claim 12, further comprising: a timing control portion, connected to the image projection device (10) and the image acquisition device (20), and configured to control the image projection device (10) to respectively emit, in each predetermined period, a predetermined stripe pattern corresponding to the predetermined period, and to control the image acquisition device (20) to respectively acquire light modulated by the target object in a plurality of predetermined periods so as to obtain a stripe image corresponding to each of the predetermined stripe patterns.

17. The three-dimensional scanner as claimed in claim 15, further comprising: a timing control portion, connected to the plurality of light source units (121) and the image acquisition device (20), and configured to control the plurality of light source units (121) to respectively emit light in different predetermined periods so as to respectively generate, in each predetermined period, initial light corresponding to the predetermined period, and to control the image acquisition device (20) to respectively acquire light modulated by the target object in a plurality of predetermined periods so as to obtain a stripe image corresponding to each beam of the initial light.

18. A three-dimensional scanning system, comprising:

a three-dimensional scanner, configured to respectively project, in each predetermined period, a predetermined stripe pattern corresponding to the predetermined period onto a target object, and acquire light modulated by the target object so as to obtain a plurality of stripe images in the case where the predetermined stripe patterns are projected onto the target object, wherein stripes of each predetermined stripe pattern are disposed according to arrangement of predetermined color-coded stripes, each predetermined stripe pattern comprises stripes of at least one color in the predetermined color-coded stripes, a plurality of predetermined stripe patterns comprise stripes of at least two colors in the predetermined color-coded stripes, and the stripes in the predetermined stripe patterns are arranged in the same way as stripes of the same color in the predetermined color-coded stripes; and an image processor, connected to the three-dimensional scanner, and configured to obtain a plurality of stripe images obtained by the three-dimensional scanner, and take the stripe images as coding images to determine respective stripe sequences and as reconstruction images to perform three-dimensional reconstruction on the target object, wherein the three-dimensional scanner is the three-dimensional scanner as claimed in claim 12;

wherein the three-dimensional scanner comprises an image acquisition device (20), the image acquisition device (20) further comprises a plurality of cameras (21), the plurality of cameras (21) comprising at least one monochrome camera, wherein the image acquisition device (20) acquires the light modulated by the target object through the plurality of cameras (21) to obtain a plurality of stripe images, a stripe image obtained by the at least one monochrome camera is taken as a reconstruction image to perform three-dimensional reconstruction on the target object; and stripe images obtained by at least a plurality of monochrome cameras are taken as coding images to determine respective stripe sequences, and/or, a stripe image obtained by at least one color camera is taken as a coding image to determine respective stripe sequences.

19. A three-dimensional scanning method, applied to the three-dimensional scanner as claimed in claim 14, the three-dimensional scanning method comprising:

respectively emitting, in each predetermined period, initial light corresponding to the predetermined period, wherein each beam of the initial light is composed of light of at least one color in the predetermined color-coded stripes, and after each beam of the initial light is transmitted by patterns of the predetermined color-coded stripes on the light transmitting portion, respective corresponding predetermined color stripes are generated and projected onto a target object;

respectively acquiring light modulated by the target object in the plurality of predetermined periods, and obtaining a plurality of stripe images based on the above light, wherein the obtained stripe images are taken as coding images to determine respective stripe sequences and as reconstruction images to perform three-dimensional reconstruction on the target object;

determining sequences of respective stripes in the plurality of stripe images based on the coding images; and performing three-dimensional reconstruction on the reconstruction images based on the sequences, and obtaining three-dimensional data of the target object;

wherein the three-dimensional scanning method further comprising:

projecting illumination light onto the target object and obtaining texture data of the target object based on the illumination light; and obtaining color three-dimensional data of the target object based on the three-dimensional data and the texture data of the target object.

* * * * *